US009231994B2

(12) United States Patent
Mela et al.

(10) Patent No.: US 9,231,994 B2
(45) Date of Patent: *Jan. 5, 2016

(54) STREAMING MEDIA

(71) Applicant: Intellectual Ventures I LLC, Wilmington, DE (US)

(72) Inventors: Martti Mela, Helsinki (FI); Pekko Pessi, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/069,817

(22) Filed: Nov. 1, 2013

(65) Prior Publication Data

US 2014/0059238 A1 Feb. 27, 2014

Related U.S. Application Data

(63) Continuation of application No. 12/699,216, filed on Feb. 3, 2010, now Pat. No. 8,599,835, which is a continuation of application No. 10/355,234, filed on Jan. 31, 2003, now Pat. No. 7,724,691.

(30) Foreign Application Priority Data

Dec. 30, 2002 (GB) .................................. 0230301.4

(51) Int. Cl.
H04L 29/06 (2006.01)
(52) U.S. Cl.
CPC ........ *H04L 65/608* (2013.01); *H04L 29/06027* (2013.01); *H04L 65/103* (2013.01); *H04L 65/104* (2013.01); *H04L 65/1006* (2013.01); *H04L 65/4092* (2013.01)
(58) Field of Classification Search
CPC ................... H04L 29/06027; H04L 29/06176; H04L 29/06197; H04L 29/06224–29/06244; H04L 65/1006; H04L 65/1066–65/1073; H04L 65/4069–65/4092; H04L 65/608
See application file for complete search history.

(56) References Cited

U.S. PATENT DOCUMENTS

| 5,822,537 | A | 10/1998 | Katseff et al. |
| 6,434,143 | B1 | 8/2002 | Donovan |
| 6,683,885 | B1 | 1/2004 | Sugai et al. |
| 6,771,639 | B1 | 8/2004 | Holden |
| 6,965,614 | B1 | 11/2005 | Osterhout et al. |
| 7,103,669 | B2 | 9/2006 | Apostolopoulos |

(Continued)

FOREIGN PATENT DOCUMENTS

| EP | 1 139 631 | 10/2001 |
| EP | 1 248 431 | 10/2002 |
| WO | WO-01/78358 | 10/2001 |
| WO | WO-02/09448 | 1/2002 |

OTHER PUBLICATIONS

Final Office Action on U.S. Appl. No. 10/355,234, mailed Oct. 11, 2007.
Final Office Action on U.S. Appl. No. 10/355,234, mailed Jun. 15, 2009.
Final Office Action on U.S. Appl. No. 12/699,216, mailed Sep. 19, 2012.
Non-Final Office Action on U.S. Appl. No. 10/355,234, mailed Jan. 13, 2009.

(Continued)

Primary Examiner — Pao Sinkantarakorn

(57) ABSTRACT

A method for providing a session invitation protocol (SIP) session between a first and a second entity. An SIP session is established between the first and second entity. At least one media stream is transmitted from the first entity to the second entity. At least one of transmission, storage and play back of the at least one media stream is controlled in the SIP session at the first and/or second entity.

19 Claims, 7 Drawing Sheets

(56) References Cited

U.S. PATENT DOCUMENTS

| | | |
|---|---|---|
| 7,126,939 B2 | 10/2006 | Barany et al. |
| 7,406,709 B2 | 7/2008 | Maher et al. |
| 2001/0046234 A1 | 11/2001 | Agrawal et al. |
| 2002/0051464 A1 | 5/2002 | Sin et al. |
| 2002/0099842 A1 | 7/2002 | Jennings et al. |
| 2002/0116464 A1 | 8/2002 | Mak |
| 2002/0126701 A1 | 9/2002 | Requena |
| 2003/0187658 A1* | 10/2003 | Selin et al. ............ 704/270.1 |
| 2004/0032864 A1 | 2/2004 | Sbisa et al. |
| 2004/0057412 A1 | 3/2004 | Curcio et al. |
| 2004/0109459 A1 | 6/2004 | Madour et al. |
| 2005/0060368 A1 | 3/2005 | Wang et al. |
| 2005/0147086 A1 | 7/2005 | Rosenberg et al. |

OTHER PUBLICATIONS

Non-Final Office Action on U.S. Appl. No. 10/355,234, mailed Apr. 16, 2008.

Non-Final Office Action on U.S. Appl. No. 10/355,234, mailed May 8, 2007.

Non-Final Office Action on U.S. Appl. No. 12/699,216, mailed Mar. 18, 2013.

Non-Final Office Action on U.S. Appl. No. 12/699,216, mailed Apr. 25, 2012.

Notice of Allowance on U.S. Appl. No. 10/355,234, mailed Oct. 1, 2009.

Notice of Allowance on U.S. Appl. No. 12/699,216, mailed Aug. 2, 2013.

* cited by examiner

With changes on message numbers (n+2), added new H12 and H13

STREAMING MEDIA

CROSS-REFERENCE TO RELATED PATENT APPLICATIONS

This application is a Continuation of U.S. patent application Ser. No. 12/699,216, filed Feb. 3, 2010, which is a Continuation of U.S. patent application Ser. No. 10/355,234, filed Jan. 31, 2003, (now U.S. Pat. No. 7,724,691) which claims priority to United Kingdom Priority Application 0230301.4, filed Dec. 30, 2002, both of which are incorporated herein by reference in their entirety.

FIELD

The present disclosure relates generally to streaming media.

BACKGROUND

A communication system is a facility that enables communication between two or more entities such as user equipment and/or other nodes associated with the system. The communication may comprise, for example, communication of voice, data, multimedia and so on. Communication is shifting to communication networks such as IP (Internet Protocol) and/or other packet switched data networks. A communication system typically operates in accordance with a given standard or specification which sets out what the various elements of the system are permitted to do and how that should be achieved. For example, the standard or specification may define if the user, or more precisely, the user equipment or terminal is provided with a circuit switched service and/or a packet switched service. Communication protocols and/or parameters which shall be used for the connection may also be defined. In other words, a specific set of "rules" on which the communication can be based needs to be defined to enable communication by means of the system. The communication between the user equipment and the elements of the communication network can be based on an appropriate communication protocol, such as the SIP (Session initiated protocol), RTSP (real time streaming protocol) or some other protocol.

RTSP is a standard protocol for controlling multimedia streaming on Internet. The RTSP-protocol however has some disadvantages. In particular, RTSP does not provide for media negotiation and the client and server cannot dynamically select best possible media formats. Media negotiation was handled at application level, for instance, several RTSP URL to a particular media resource could be given, each with particular media parameters. The RTSP DESCRIBE method can be used to retrieve stream parameters from the RTSP streaming server. No negotiation is done and the streaming is possible only if the client supports the media and codecs listed in the response to DESCRIBE.

SIP (Session Invitation Protocol, RFC 3261) is a popular protocol used to setup multimedia sessions. Its applications include, for instance, Internet telephony and conferencing. SIP provides means for publishing endpoint capabilities, negotiating session contents (which media are used, which codecs are used, etc.) and updating sessions. It also includes means for subscribing to events and delivering event documents whenever the event status has been changed. It can handle negotiations for communications sessions dynamically. However, the SIP protocol does not support multimedia streaming.

SUMMARY

It is an aim of embodiments of the present invention to address the above mentioned problems.

According to a first aspect of the present invention there is provided a method for providing an SIP session between a first and a second entity, said method comprising the steps of establishing a SIP session between the first and second entity; transmitting at least one media stream between the first entity and the second entity and controlling at least one of transmission, storage and play back of the at least one media stream at said first and/or second entity.

According to a second aspect of the present invention there is provided a method of providing an SIP session between a first and a second entity, and a RTSP session between said second entity and a third entity, said method comprising the steps of establishing a SIP session between the first and second entity; establishing an RTSP session between said second entity and said third mapping between SIP and RSTP information to allow data to pass from one of said first and third entities to the other of said first and third entities.

According to a third aspect of the present invention, there is provided a method of providing a SIP session between a first entity and a second entity, said method comprising the steps of establishing a SIP session between the first and second entities; providing at least one media stream to one of said first and second entities from the other of said entities; and updating said at least one media stream during said session.

According to a fourth aspect of the present invention, there is provided a communications system comprising a first and second entity, said first and second entity being operable to establish a SIP session between the first and second entity, one of said entities being arranged to transmit at least one media streams to the other entity, said system being such that at least one of transmission, storage and play back of the media streams is controlled at least one of said entities.

According to a fifth aspect of the present invention, there is provided a communications system comprising a first and second entity, said first and second entity being operable to establish a SIP session between the first and second entity, said first entity being arrange to retrieve a description of a session, said first and second entities being arranged to establish a session therebetween, one of the entities being arranged to send at least one media stream to the other entity and said other entity being arranged to control the play back of the media streams.

According to a sixth aspect of the present invention, there is provided a communications system comprising a first and a second entity, said first and second entity being operable to establish a SIP session between the first and second entity, one of said entities being arranged to transmit at least one media stream to the other entity, wherein said at least one of said media streams can be sent at one of a plurality of different playback rates.

According to a seventh aspect of the present invention, there is provide a communications system comprising a first, second and third entity wherein the first and second entities are arranged to establish a SIP session therebetween, and the second and third entities are arrange to establish a RTSP session therebetween, said second entity being arranged to map between SIP and RSTP information to allow data to pass from one of said first and third entities to the other of said first and third entities.

According to an eighth aspect of the present invention, there is provided a communications system comprising a first and a second entity, said first and second entity being operable to establish a SIP session between the first and second entity, one of said entities being arranged to transmit at least one media stream to the other entity, wherein said at least one media stream us updatable during said session.

According to a ninth aspect of the present invention, there is provided a gateway for use in a communications system, wherein said gateway is arranged to establish a SIP session with one entity and a RTSP session with a further entity, said gateway being arranged to map between SIP and RSTP information to allow data to pass from one of said first and third entities to the other of said first and third entities.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE PREFERRED EMBODIMENTS

Figure 1:
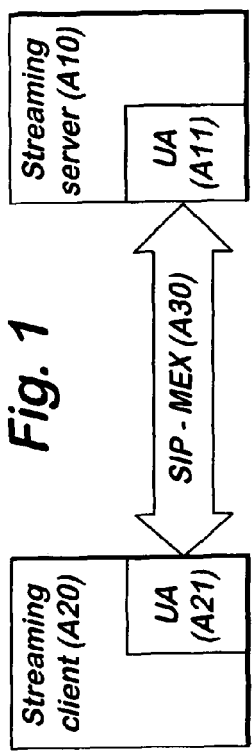
FIG. 1 illustrates streaming with SIP in which by using SIP-MEX (SIP with media streaming extensions) streaming media content is supported in SIP domain.

FIG. 1 shows a schematic diagram of streaming with SIP, in accordance with embodiments of the invention. A streaming client A20 is using a user application A21 to receive streaming media from a user Application A11 of a streaming server A10. SIP-MEX A30 is used to provide streaming features to SIP.

Figure 2:
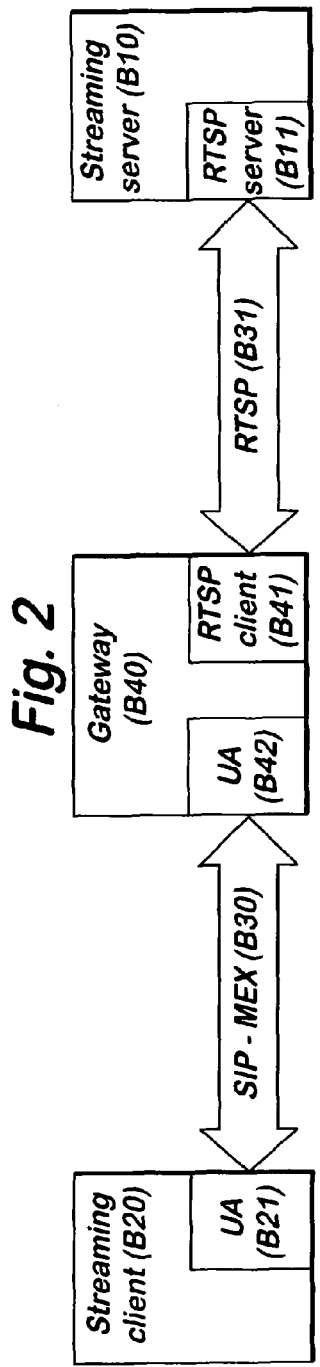
FIG. 2 illustrates a gateway between a streaming client and an RTSP-server which is used to enable streaming from RTSP to SIP domain.

FIG. 2 shows a schematic diagram of streaming media content between a RTSP Server B11 and a SIP User Application B21, in accordance with an embodiment of the invention. The streaming server B10 has an RTSP server B11 which sends streaming media content via a RTSP connection B31 to a RTSP Client B41 of a gateway B40. The gateway B40 handles the mapping of the streaming media originating from the RTSP server B11 to a user application B42 of the gateway so that it is compatible with the SIP-MEX B30 connection. The user application B42 of the gateway sends the streaming media content via the SIP-MEX B30 connection to the user application B21 of the streaming client B20, which is in the SIP domain.

Figure 3:
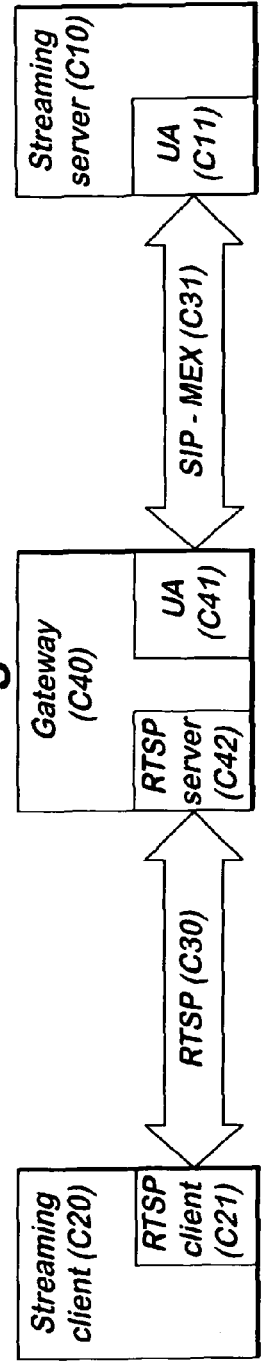
FIG. 3 illustrates gateway between RTSP domain and SIP media server, where the stream is fetched from the SIP Media Server to RTSP domain.

FIG. 3 shows schematically an embodiment of the invention with a gateway C40 between a RTSP domain C20 and a SIP media server C10, where the stream is fetched from the SIP Media Server C10 to RTSP domain C20. The user application C11 of the streaming server C10 sends streaming media content via a SIP-MEX connection C31 to the user application C41 of the gateway C40. The gateway C40 handles the mapping of the streaming media originating from the user application of the streaming server C11 to the RTSP server C42 so that it is compatible with the RTSP connection C30. The RTSP Server C42 sends the streaming media content via the RTSP connection C30 to the RTSP Client C21 of the streaming client C20 which is in the RTSP domain.

Figure 4:
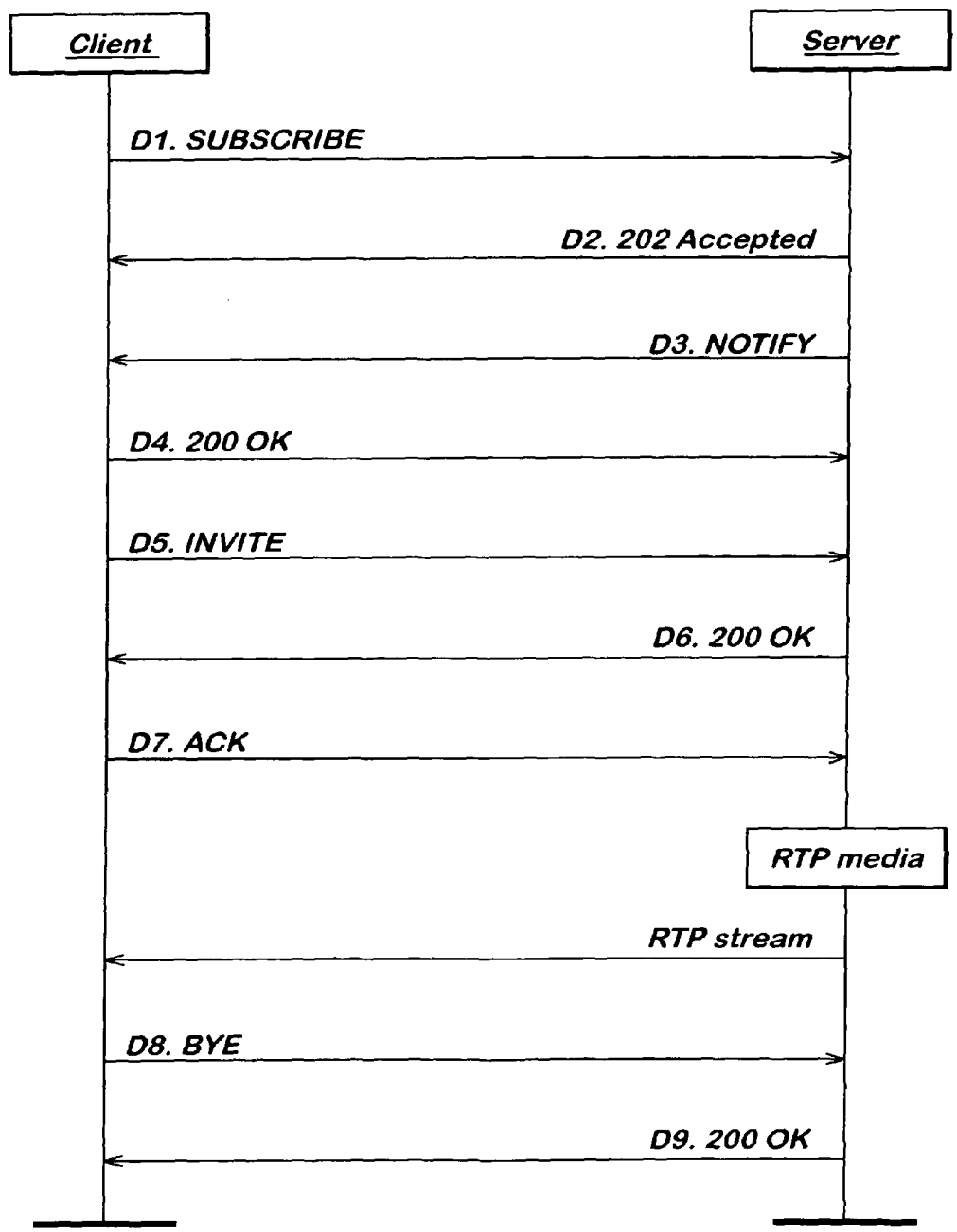
FIG. 4 illustrates an example of SIP in streaming

FIG. 4 illustrates messaging between a client and a server, using SIP streaming. For the sake of clarity, features of the messages are explained only once, and previously explained or known SIP information is assumed to be understood by any person skilled in the art. In this example, the client requests streaming media, and decides that the movie or any other multimedia stream should be played. The user also decides to stop the streaming during the movie.

The communication is started by sending a SUBSCRIBE D1 message from the client to the server. This message is used to indicate that a client wants to request streaming media.

The first message D1 SUBSCRIBE from Client to Server is in the following form:

```
SUBSCRIBE sip:movies/matrix@media.nokia.com;user=stream
SIP/2.0
From: <sip:user@nokia.com>
To: <sip:movies/matrix@media.nokia.com;user=stream>
Cseq: 1 SUBSCRIBE
Call-ID: 1c5e3780-5834-11d6-a882-00e00307ab95
Contact: <sip:172.21.164.126>
Expires: 0
Event: session-description
Accept: application/sdp
Content-length: 0
```

This message is now explained in more detail:
SUBSCRIBE sip:movies/matrix@media.nokia.com; user=stream SIP/2.0

The method of the message is SUBSCRIBE. This field is used to describe what the client is requesting and that the version of SIP used is 2.0. Use of URI (uniform resource identifier) user part "movies/matrix" defining the source of requested streaming media is additional information proposed by embodiments of the invention compared to current features of SIP-protocol. Additionally, use of the URI parameter "user=stream", which defines that streaming is to be used, is also an additional feature proposed by embodiments of the present invention to the current SIP-protocol. These additional features to the SIP-protocol are referred as SIP-MEX.

From: <sip:user@nokia.com>
This header field is indicating from whom the message is originating. From field is typical field in the present SIP-protocol message and the value of the field is in accordance with present version of SIP-protocol. However use of SIP-MEX may require use of additional information in this field, so that address of the streaming media can be defined accurately.

To: <sip movies/matrix@media.nokia.com;user=stream>
This header field is indicating for whom the message is intended. To field is a typical field in the present SIP-protocol message, however in this case the field is additionally used in embodiments of the invention and contains additional information compared to present version of SIP identifying the source of the multimedia stream.

Cseq: 1 SUBSCRIBE
This header field indicates the sequence number of the sent request. Cseq is a feature of the present version of SIP.

Call-ID: 1c5e3780-5834-11d6-a882-00e00307ab95
This header field indicates the identity of this connection. Call-ID is a feature of the present version of SIP.

Contact. <sip.172.21.164.126>

This header field indicates the actual SIP host-port address of the client where the notifications from the other end will be sent. Contact is a feature of present version of SIP.

Expires: 0

This field header indicates the duration of the subscription. The expires value of 0 indicates that subscription is terminated immediately after initial notification is sent. In other words, the sender of SUBSCRIBE request only wants to query the current description of streaming resource identified by the URI sip:movies/matrix@media.nokia.com. Expires is feature of present version of SIP.

Event: Session-Description

This header field indicates the event package to which the client is subscribing. Event names are used to separate different SIP event types from each other. Event header is a feature of present version of SIP, but the session-description event type is an additional feature provided by SIP-MEX.

Accept: Application/SDP

This header field indicates that client will only accept responses containing the stream parameters in SDP (session description protocol) format. Accept is feature of present version of SIP.

Content-Length: 0

This header field indicates the length of the message payload (number of characters). Content-length is feature of present version of SIP.

After receiving the SUBSCRIBE message D1 from the Client, the Server answers the Client with message 202 Accepted D2. The response acknowledges that the other end has received the SUBSCRIBE message and the client can start waiting for NOTIFY messages.

The message 202 Accepted from the server to the client is as follows:

```
SIP/2.0 202 Accepted
To: <sip:movies/matrix@media.nokia.com;user=stream>
From: <sip:user@nokia.com>
Call-ID: 1c5e3780-5834-11d6-a882-00e00- 307ab95
Contact: <sip:movies/matrix@131.228.54.140;user=stream>;
Event: session-description
Cseq: 1 SUBSCRIBE
Content-length: 0
```

SIP/2.0 202 Accepted

The status code of this response message is 202 with reason phrase "Accepted". This field indicates the class of the response message.

Contact: <sip:movies/matrix@131.228.54.140; user=stream>

This header field indicates the source of the streaming media. In this case the field is only compatible with SIP-MEX because it is contains the additional information discussed previously, as compared to present version of SIP.

All other fields of this message are similar to those previously explained.

The server also sends to the client a NOTIFY D3 message. The server encloses the stream parameters in the payload of the NOTIFY message and can push the information to the client dynamically.

The message D3 NOTIFY from the server to the client:

```
NOTIFY sip:172.21.164.126 SIP/2.0
From: <sip:movies/matrix@media.nokia.com;user=stream>
To: <sip:user@nokia.com>
Call-ID: 1c5e3780-5834-11d6-a882-00e00- 307ab95
Contact: <sip:movies/matrix@131.228.54.140;user=stream>;
CSeq: 1 NOTIFY
Event: session-description
Range: smtpe-25=00:00:00-02:16:13
Subscription-State: terminated;reason=timeout
Content-type: application/sdp
Content-length: 131
v=0
o=media-server 1804289383 2 IN IP4 131.228.54.140
s=The Matrix
u=http://us.imdb.com/Titl- e?0133093
t=0 0
a=control: sip:movies/matrix@media.nokia.c- om;user=stream
a=send only
m=audio 0 RTP/AVP 96 97 98
a=rtpmap:96 AMR-WB/16000
a=rtpmap:97 AMR/8000
a=rtpmap:98 L16/48000/2
m=video 0 RTP/AVP 26 31
```

The method of this message is NOTIFY, its request-URI is sip:172.21.164.126. The field indicates the method name and the address where the message is sent.

Range: smtpe-25=00:00:00-02:16:13

This header field indicates the length of the movie or multimedia stream. Range is an additional feature provided by SIP-MEX, in embodiments of the invention.

Subscription-State: Terminated; Reason=Timeout

This header field indicates the state of the SIP event subscription. The value "terminated" indicates that the subscription is no more active. The "reason" parameter indicates reason for termination. In this case, the one-shot subscription is terminated with the first notification.

Content-Type: Application/SDP

This header field indicates the MIME multimedia internet mail extension type of the content.

Content-length header field indicates the length of the content and is a feature of the present version of SIP.

The rest of the message belongs to its contents, which consists of stream description in SDP language.

v=0

The version "v=" field indicates the version of SDP in use. Field v is feature of present version of SIP.

o=media-server 1804289383 2 IN IP4 131.228.54.140

The origin "o=" field indicates the identity and version of the session description. Field o is feature of present version of SIP.

s=The Matrix

The subject "s=" field indicates the subject of the stream. Field s is feature of present version of SIP.

u=http://usimdb.com/Title?0133093

This field indicates the URL where additional information about the session can be obtained.

t=0 0

The time "t=" field indicates the start and stop time of the multicast sessions. In this case, the start and stop time depend on client action, and the field is included only because SDP syntax requires it. Field t is feature of the present version of SIP.

The attribute "a=" fields contain optional information about session or media. Field a is a feature of the present versions of SIP and SDP. The SIP user agent will ignore the SDP attributes it does not know.

a=control: sip:movies/matrix@media.nokia.com; user=stream

The attribute "control" indicates the URI that can be used to manipulate the media stream. The "control" attribute is only compatible with SIP-MEX because it contains additional information compared to present version of SIP.

a=sendonly

The send only attribute field indicates that media session is only unidirectional, from server towards the client. The "send only" attribute is a feature of the present version of SIP.

m=audio 0 RTP/AVP 96 97 98

The "m=" media field indicates the type of a media stream within the streaming session. It contains the media type (audio), the transport port (0) and protocol (RTP/AVP) and then alternative media formats (expressed as RTP payload numbers). The server is able to send media using any of the media formats listed here. The client can choose the media format from the list provided by the server based on its own preferences and the network capacity available to it. Field m is feature of present version of SIP a=rtpmap:96 AMR-WB/16000

The "rtpmap" attribute indicates mapping from RTP payload number 96 to an audio format AMR-WB with sample rate of 16 kHz. The "rtpmap" attribute is feature of present version of SIP.

a=rtpmap:97 AMR/8000

The "rtpmap" attribute indicates mapping from RTP payload number 97 to an audio format AMR with sample rate of 8 kHz. The "rtpmap" attribute is feature of present version of SIP.

a=rtpmap:98 L16/48000/2

The "rtpmap" attribute indicates mapping from RTP payload number 98 to an audio format L16 with sample rate of 48 kHz and two channels. The "rtpmap" attribute is feature of present version of SIP.

m=video 0 RTP/AVP 26 31

The "m=" media field indicates the media type of a stream within the session. It contains the media type (video), the transport port (0) and protocol (RTP/AVP) and then alternative media formats (expressed as well-known RTP payload numbers, 26 stands for JPEG, 31 for H.261).

All other fields of this message are similar to those previously explained.

After the client receives the NOTIFY (D3) message from the server, the Client sends a 200 OK message D4 to the server to confirm that it has received parameters for the streaming connection.

The message 200 OK from Client to Server is as follows.

```
SIP/2.0 200 OK
  To: <sip:user@nokia.com>
  From: <sip:movies/matrix@media.nokia.com;user=stream>
  Call-ID: 1c5e3780-5834-11d6-a882-00e00307ab95
  CSeq: 1 NOTIFY
  Content-length: 0
```

The status code of this response message is 200 with reason phrase "OK". The status code 200 indicates success.

All other fields of this message are similar to those previously explained.

The user interface on the client can now show the stream information on the user terminal. The client starts streaming the movie. The user wants to start fast rewind with the picture starting from the end of the movie, so the Range and Scale Headers are sent in the INVITE message D5.

The message INVITE from Client to Server is as follows

```
INVITE sip:movies/matrix@media.nokia.com;user=stream SIP/2.0
  From: <sip:user@nokia.com>
  To: <sip:movies/matrix@media.nokia.com;user=stream>
```

-continued

```
  Cseq: 1 INVITE
  Call-ID: 87ed5e72-5834-11d6-a882-00e00307ab95
  Contact: <sip:172.21.164.126>
  Range: smtpe-25=-02:16:13
  Scale: -2.0
  Content-type: application/sdp
  Content-length: 131
  v=0
  o=-816357754 1 IN IP4 172.21.164.126
  s=-
  t=0 0
  c=IN IP4 172.21.164.126
  a=recvonly
  m=audio 20582 RTP/AVP 96
  a=rtpmap:96 AMR-WB/16000
  m=video 20584 RTP/AVP 31
```

The method of this request message is INVITE with the request URI sip:movies/matrix@media.nokia.com; user=stream SIP/2.0. The field indicates the name of the SIP method and the SIP address of the recipient. The user part (movies/matrix) in the address specifies the stream at the server. The parameter user=stream provides the network elements with an option to separate streaming handling from VoIP (voice over IP) calls.

Scale: -2.0

This field indicates that the playback rate of the stream is set to 2 (that is twice the normal rate) and that the direction of the stream is reversed due to the negative value. Scale is an additional feature provided by SIP-MEX in embodiments of the present invention c=IN IP4 172.21.164.126

The connection "c" field indicates the network address of the client. The client asks server to send the media streams to the address specified in field c. Field c is feature of present version of SIP.

a=recvonly

The "recvonly" attribute indicates that client wants to establish an unidirectional media session, from server towards the client. The "recvonly" attribute is a feature of the present version of SIP.

m=audio 20582 RTP/AVP 96 a=rtpmap:96 AMR-WB/16000

The media description, consisting of field m and the rtpmap attribute, indicates the type of media stream within the streaming session that the client is prepared to receive. It contains the media type (audio), the transport port (20582) and transport protocol (RTP/AVP) that the client uses to receive media. After the transport protocol, the client then lists the media format (expressed as dynamic RTP payload number on the "m=" line and the "rtpmap" attribute below it) that it expects to receive. The server is able to use any of the media formats listed here to send the media stream. If the streaming resource does not contain media in the listed formats, the server can either convert the format in streaming resource to the format accepted by client, or if it cannot do converting, decline the request. The session description in E3 contained the formats readily supported by server, so the client should include one of the formats listed in E3 in its request here. Field m is feature of present version of SIP.

All other fields of this message are similar to those explained previously.

After receiving the INVITE message D5 from the client, the server sends a confirmation message 200 OK D6 to the client.

The message 200 OK from the server to the client is also follows:

```
SIP/2.0 200 OK
To: <sip:movies/matrix@media- .nokia.com;user=stream>
From: <sip:user@nokia.com>
Cseq: 1 INVITE
Call-ID: 87ed5e72-5834-11d6-a882-00e00307ab95
Contact: <sip:movies/matrix@131.228.54.140;user=stream>
Content-type: application/sdp
Content-length: 131
Range: smtpe-25=00:00:00-02:16:13
Scale: −1.80
Speed: 1
v=0
o=media-server 1804289383 321763 IN IP4 131.228.54.140
s=The Matrix
a=control: sip:movies/matrix@131.228.54.140;user=stream
t=0 0
c=IN IP4 131.228.54.140
a=sendonly
m=audio 32852 RTP/AVP 96
a=rtpmap:96 AMR-WB/16000
m=video 32850 RTP/AVP 26
```

The status code of this response message is 200 with reason phrase "OK". The status code 200 indicates success.

Speed: 1

This field value indicates that no buffering is to be used, the server will send stream at the same rate as it should be played out by the client. Speed is an additional feature provided by SIP-MEX in embodiments of the present invention.

All other fields of this message similar to those described previously.

After the client receives confirmation message 200 OK D6 from the server, the client acknowledges the server that it has received 200 OK D6 message by sending ACK message D7 to the server.

The message ACK from the client to the server is as follows

```
ACK sip:movies/matrix@131.228.54.140;user=stream SIP/2.0
From: <sip:user@nokia.com>
To: <sip:movies/matrix@media.nokia.com;user=stream>
Cseq: 1 ACK
Call-ID: 87ed5e72-5834-11d6-a882-00e00307ab95
Content-length: 0
```

The method of this message is ACK.

All other fields of this message are similar to those discussed earlier.

The server starts RTP media streaming. When the client wants to terminate the stream, it sends a BYE message D8 to the server.

The message BYE from the client to the server is as follows

```
BYE sip:movies/matrix@131.228.54.140;user=stream SIP/2.0
From: <sip:user@nokia.com>
To: <sip:movies/matrix@media.nokia.com;user=stream>
Cseq: 2 BYE
Call-ID: 87ed5e72-5834-11d6-a882-00e00307ab95
Content-length: 0
```

The method of this request message is BYE, its request-URI is sip:movies/matrix@131.228.54.140;user=stream. The purpose of this message is to terminate the session.

All other fields of this message similar to those discussed previously.

When the server receives from the client the message BYE it sends a confirmation message 200 OK D9 to the client and stops the streaming The message 200 OK from the server to the client is as follows

```
SIP/2.0 200 OK
To: <sip:movies/matrix@media.nokia.com;user=stream>
From: <sip:user@nokia.com>
Cseq: 2 BYE
Call-ID: 87ed5e72-5834-11d6-a882-00e00307ab95
Content-length: 0
```

The status code of this response message is 200 with reason phrase "OK". The status code 200 indicates success.

All other fields of this message are similar to those already described.

Figure 5:
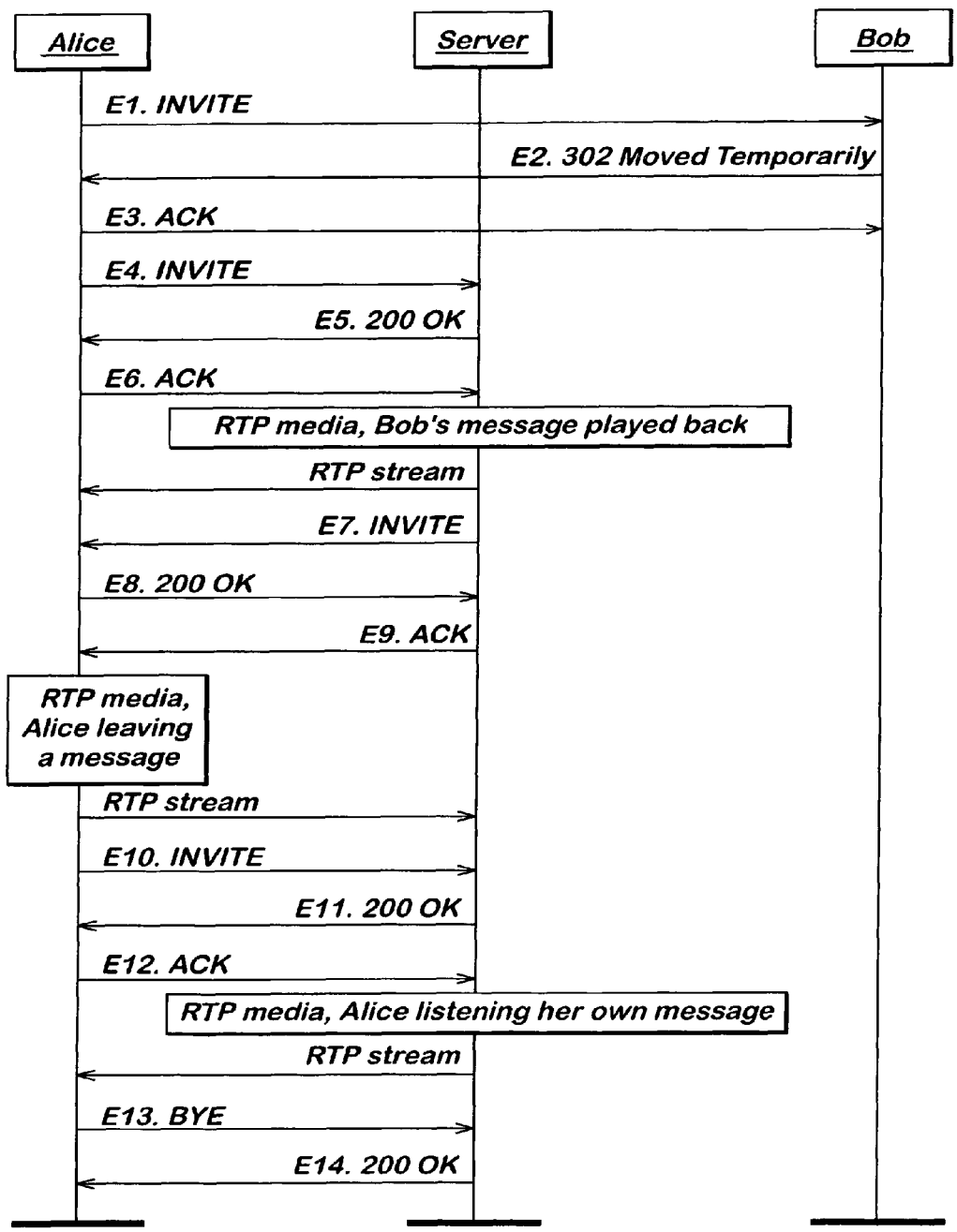
FIG. 5 illustrates an example of voicemail with SIP

In a second example of using streaming media in SIP, this example involves using and controlling a voice mail box with SIP. FIG. 5 illustrates how messaging between parties involved are exchanged. Individual messages and actions between the parties are explained after each message. For the sake of clarity, only new features in the messages are explained. The first party, Alice, tries to call the second party, Bob, but the incoming call is redirected to an voicemail server. Alice hears a pre-recorded message from the voicemail server. Alice decides to leave a voicemail message for Bob in the voice mailbox. After recording a voicemail message Alice wants to review the message she is leaving in the voice mailbox. The voicemail server plays to Alice the message she has left for Bob and then Alice tears down the connection with the voicemail server. In this use case there are included streaming control parameters (Range, Scale, Speed) in the SDP instead of using SIP headers.

Communication is started by sending an INVITE message E1 from the client to the server. This message is used to advise that a client wants to request streaming media.

The message INVITE from Alice to Bob takes the following form:

```
INVITE sip:bob@nokia.com SIP/2.0
From: <sip:alice@nokia.com>
To: <sip:bob@nokia.com>
Cseq: 1 INVITE
Call-ID: 87ed5e72-5834-11d6-a882-00e00307ab95
Contact: <sip:172.21.164.126>
Content-type: application/sdp
Content-length: 131
v=0
o=−816357754 1 IN IP4 172.21.164.126
s=−
t=0 0
c=IN IP4 172.21.164.126
m=audio 20582 RTP/AVP 96 8 0
a=rtpmap:96 AMR/8000
```

The fields are as already described.

When Bob receives the INVITE message E1 from Alice, the request for connection is answered with message 302 Moved Temporarily E2

The message Moved Temporarily from Bob to Alice E2 is as follows

```
SIP/2.0 302 Moved Temporarily
From: <sip:alice@nokia.com>
To: <sip:bob@nokia.com>
Cseq: 1 INVITE
Call-ID: 87ed5e72-5834-11d6-a882-00e00307ab95
Contact: <sip:bob@mailbox.nokia.com;user=stream>
Content-Type: text/html
Content-Length: 121
```

```
<html>
<title>Please leave a message</title>
<body>
Please leave a message at <a href="sip:bob@mailbox.nokia.com">;
my voicemail</a>.
</body>
</html>
```

Topic of this message is SIP/2.0 302 Moved Temporarily, which indicates effectively that Bob is unavailable and diverts the call to the voice mail box.

In the Hypertext Markup Language (HTML) part of this message data is transferred from Bob to Alice. Alice will receive a request to leave message to Bob's voicemail and a hyperlink to the voice mailbox is included in the message. The other fields are as already described.

Alice responds to the 302 Moved Temporarily message from Bob with message E3-ACK to acknowledge that she have received message from Bob.

The message ACK from Alice to Bob is as follows:

```
ACK sip:bob@nokia.com SIP/2.0
From: <sip:alice@nokia.com>
To: <sip:bob@nokia.com>
Cseq: 1 ACK
Call-ID: 87ed5e72-5834-11d6-a882-00e00307ab95
Content-Length: 0
```

The fields are as already described.

Alice can now redirect her connection to the voicemail server. Alice sends an INVITE message E4 to the voicemail server.

The message INVITE form Alice to Server is as follows:

```
INVITE sip:bob@mailbox.nokia.com;user=stream SIP/2.0
From: <sip:alice@nokia.com>
To: <sip:bob@nokia.com>
Cseq: 2INVITE
Call-ID: 87ed5e72-5834-11d6-a882-00e00307ab95
Contact: <sip:172.21.164.126>
Content-type: application/sdp
Content-length: 131
v=0
o=-816357754 1 IN IP4 172.21.164.126
s=-
t=0 0
c=IN IP4 172.21.164.126
m=audio 20582 RTP/AVP 96 8 0
a=rtpmap:96 AMR/8000
```

The topic of this message is INVITE sip:bob@mailbox.nokia.com;user=stream SIP/2.0. The URI parameter user=stream indicates that streaming media will be used. The header and SDP fields are as already described.

After receiving the INVITE message from Alice, the server confirms that it has received the message from Alice and the Server send a 200 OK message E5 to Alice.

The 200 OK message from the server to Alice is as follows:

```
SIP/2.0 200 OK
From: <sip:alice@nokia.com>
To: <sip:bob@nokia.com>
Cseq: 2 INVITE
Call-ID: 87ed5e72-5834-11d6-a882-00e00307ab95
Contact: <sip:bob@131.228.54.140;user=stream>
Content-type: application/sdp
Content-length: 131
v=0
o=media-server 1804289383 321763 IN IP4 131.228.54.140
a=control:sip:bob@131.228.54.140;user=stream
t=0 0
c=IN IP4 131.228.54.140
a=sendonly
a=range:ntp=-32.0
m=audio 32852 RTP/AVP 96
a=rtpmap:96 AMR/8000
a=control:sip:bob@131.228.54.140;user=stream
```

The control attribute field indicates the URI that is used to control the streaming media resource. The control attribute field is only compatible with SiP-MEX because it contains additional information compared to present version of SIP, but it will be silently ignored by any SIP user-agent not supporting SIP-MEX.

a=range:ntp=-32.0

The range attribute field indicates the length of the pre-recorded message. The range attribute field is only compatible with SIP-MEX because it contains additional information compared to present version of SIP, but it will be silently ignored by any SIP user-agent not supporting SIP-MEX.

The other fields are as already described.

After Alice receives the 200 OK message from the server, Alice responds to the Server with the message ACK E6 to inform the server that Alice is ready to receive streaming media from the Server.

The message ACK from Alice to the Server is as follows:

```
ACK sip:bob@131.228.54.140;user=stream SIP/2.00
From: <sip:alice@nokia.com>
To: <sip:bob@nokia.com>
Cseq: 2 INVITE
Call-ID: 87ed5e72-5834-11d6-a882-00e00307a- b95
Content-length: 0
```

The message E6 ACK is similar to message E3 ACK. In E6 ACK Alice informs the server that streaming will be used.

After the Server receives message E6 ACK from Alice, the Server starts playing out the pre-recorded message form Bob, which lasts 32 seconds as indicated in message 200 OK by the Server. After the pre-recorded message is played, Alice is given a chance to record her 60-second voicemail to Bob. Alice is sent an INVITE message E10 updating the session and she is redirected to a URL specific to her message at the same time, by using a contact header.

The message INVITE E7 sent from the server to Alice is as follows:

```
INVITE sip:172.21.164.126 SIP/2.0
From: <sip:bob@nokia.com>
To: <sip:alice@nokia.com>
Cseq: 0 INVITE
Call-ID: 87ed5e72-5834-11d6-a882-00e00307ab95
Contact: <sip:bob/msg.10101@131.228.54.140;user=stream>
Content-type: application/sdp
Content-length: 131
v=0
o=media-server 1804289383 321764 IN IP4 131.228.54.140
s=-
t=0 0
c=IN IP4 131.228.54.140
a=control:sip:bob/msg.10101@131.228.54.140;user=stream
a=sendrecv
a=range:ntp=0.0-60.0
```

```
m=audio 32852 RTP/AVP 96
a=rtpmap:96 AMR/8000
```

Contact: <sip:bob/msg.10101@131.228.54.140; user=stream>

This field indicates that the streaming media connection should be directed to the given address. In this case, the field Contact has additional feature provided by SIP-MEX.

a=controi:sip:bobimsg.10101@131.228.54.140; user=stream

The control attribute field indicates the URI that is used to control the streaming media resource. The attribute is different from the URI given in earlier SDP, and the change indicates that the media resource to which Alice is now being redirected is different from resource played out earlier.

a=range:ntp=0.0-60.0

The range attribute field indicates that the length of the message Alice can record for Bob is something between 0 seconds and 60 seconds. The range attribute field is an additional feature, provided by embodiments of the invention.

The other fields are as already described.

Alice then decides to leave a voicemail in to the Bob's voice mailbox. Alice sends an 200 OK message E8 to the server and confirms that she wants to leave a voicemail.

The message 200 OK from Alice to the server is as follows:

```
SIP/2.0 200 OK
From: <sip:bob@nokia.com>
To: <sip:alice@nokia.com>
Cseq: 0 INVITE
Call-ID: 87ed5e72-5834-11d6-a882-00e00307ab95
Contact: <sip:172.21.164.126>
Content-type: application/sdp
Content-length: 131
v=0
o=-816357754 2 IN IP4 172.21.164.126
s=-
t=0 0
c=IN IP4 172.21.164.126
m=audio 20582 RTP/AVP 96
a=rtpmap:96 AMR/8000
```

The fields are as already described.

After the server receives the confirmation message E8 from Alice, the server acknowledges to Alice that it has received message E8 by sending an acknowledgment ACK message E9 to Alice.

The message E9 from the server to Alice is as follows:

```
ACK sip:172.21.164.126 SIP/2.0
From: <sip:bob@nokia.com>
To: <sip:alice@nokia.com>
Cseq: 0 ACK
Call-ID: 87ed5e72-5834-11d6-a882-00e00307ab95
Content-length: 0
```

The fields are as already described.

Alice has now a streaming connection with the server, and Alice can now record her message to Bob. However, Alice wants to review her message, which she can do it by sending an INVITE message E10 to the server. Note that the Request URI is the URL provided in the Contact header of the message E10 sent by the voicemail server. The same URL is also specified in the updated SDP. The Request URI is specific to the voicemail message recorded by Alice.

The message E10 from Alice to the Server is as follows

```
INVITE sip:bob/msg.10101@mailbox.nokia.com;user=stream SIP/2.0
From: <sip:alice@nokia.com>
To: <sip:bob@nokia.com>
Cseq: 3 INVITE Call-ID: 87ed5e72-5834-11d6-a882-00e00307ab95
Contact: <sip:172.21.164.126>
Content-type: application/sdp
Content-length: 131
v=0
o=-816357754 3 IN IP4 172.21.164.126
s=-
t=0 0
c=IN IP4 172.21.164.126
a=range:ntp=0.0-
a=recvonly
m=audio 20582 RTP/AVP 96 8 0
a=rtpmap:96 AMR/8000
```

The fields are as already described.

After receiving message E10 from Alice, the Server answers Alice with a 200 OK message E11 confirming that it has received the message from Alice.

The message E11 from the server to Alice is as follows

```
SIP/2.0 200 OK
From: <sip:alice@nokia.com>
To: <sip:bob@nokia.com>
Cseq: 3 INVITE
Call-ID: 87ed5e72-5834-11d6-a882-00e00307ab95
Contact: <sip:bob/msg.10101@131.228.54.140;user=stream>
Content-type: application/sdp
Content-length: 131
v=0
o=media-server 1804289383 321764 IN IP4 131.228.54.140
s=-
t=0 0
c=IN IP4 131.228.54.140
a=control:sip:bob/msg.10101@131.228.54.140;user=stream
a=sendonly
a=range:ntp=0.0-27.6
m=audio 32852 RTP/AVP 96
a=rtpmap:96 AMR/8000
```

The fields are as already described.

After Alice receives the 200 OK message from the Server, Alice responds to the Server with an ACK message E12 to inform the server that Alice is ready to listen to the message that she has left for Bob, so that Alice receives the streaming media from the server The message E12 from Alice to the Server is as follows

```
ACK sip:bob/msg.10101@131.228.54.140;user=stream SIP/2.0
From: <sip:alice@nokia.com>
To: <sip:bob@nokia.com>
Cseq: 3 ACK
Call-ID: 87ed5e72-5834-11d6-a882-00e00307ab95
Content-length: 0
```

The fields are as already described.

After Alice has reviewed her voicemail to Bob, Alice decides to disconnect from the server, so she hangs up the call. The message E13-BYE is sent from Alice to the server.

The message E13 BYE from Alice to the server is as follows:

```
BYE sip:bob/msg.10101@131.228.54.140;user=stream SIP/2.0
From: <sip:alice@nokia.com>
To: <sip:bob@nokia.com>
```

Cseq: 4 BYE
Call-ID: 87ed5e72-5834-11d6-a882-00e00307ab95
Content-length: 0

The fields are as already described.

The server receives message E13 from Alice and it responds to that message by sending message E14-200 OK to Alice to confirm the teardown of the connection.

The message E14 from the server to Alice is as follows:

SIP/2.0 200 OK
From: <sip:alice@nokia.com>;
To: <sip:bob@nokia.com>
Cseq: 4 BYE
Call-ID: 87ed5e72-5834-11d6-a882-00e00307ab95
Content-length: 0

The fields are as already described

Figure 6:
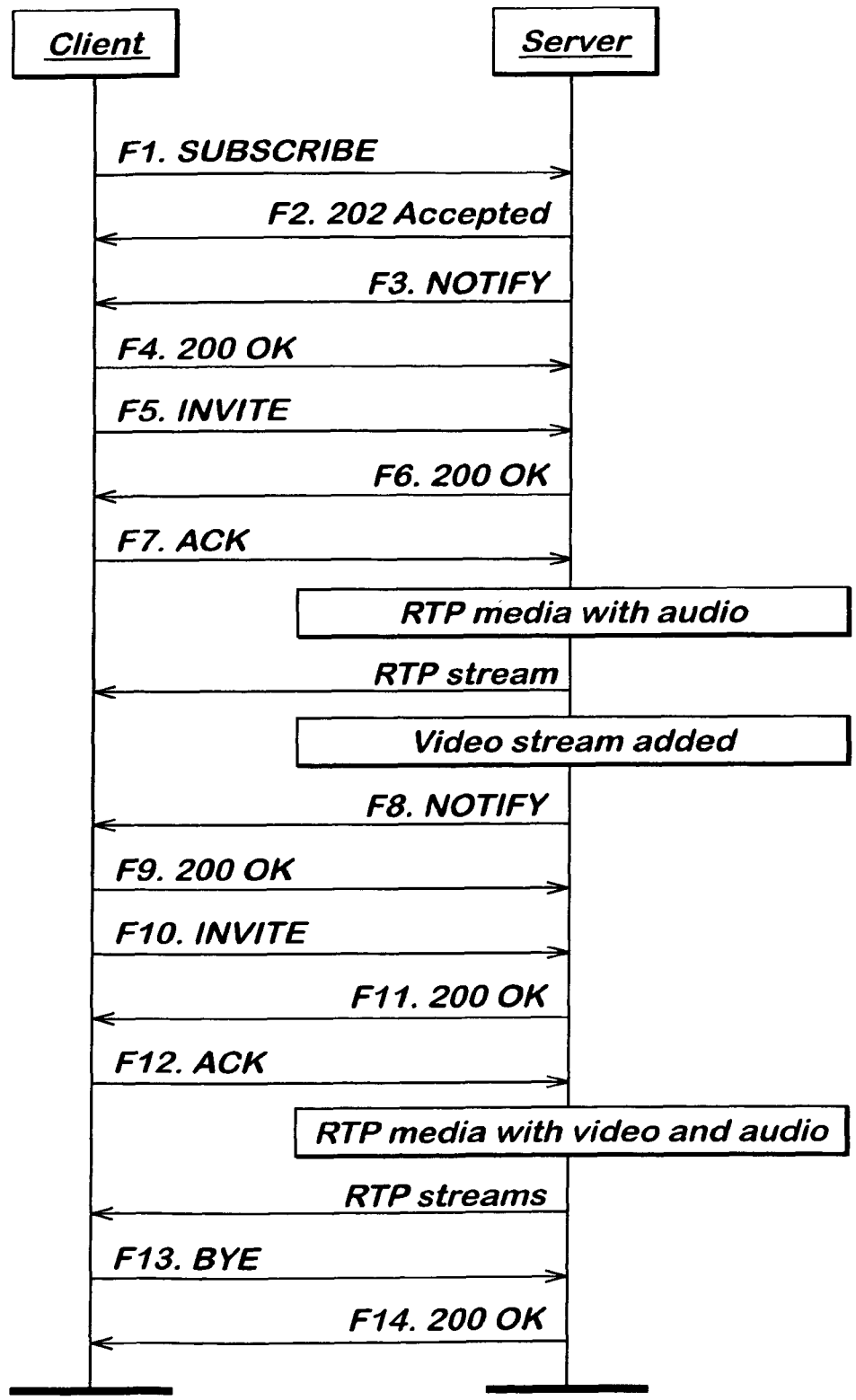
FIG. 6 illustrates updating of stream parameters in streaming

In the third example of using streaming media in SIP, this case presents an advanced case of use of SIP in streaming FIG. 6 illustrates messaging between a client and a server. In this case a client requests streaming a live media stream (audio) from the server. While the original stream (audio) is playing, a stream (video) is added to it. Changes in the stream are made with NOTIFY message which notifies the Client about a new stream (video). The client decides to receive the new stream (video), too. The Client negotiates the media again, now with video support. Messaging happens simultaneously, so the original stream (audio) need not be cancelled.

Communication between the Client and Server is started by the message F1 SUBSRCIBE from Client to Server. Steps from F1 to F7 are the similar to steps D1 to D7 of FIG. 4. The full messages for messages F1 to F7 are set out below.

Message F1

SUBSCRIBE sip:reports/interim/q2-2002@- media.nokia.com; user=stream SIP/2.0
From: <sip:user@nokia.com>
To: <sip:reports/interim/q2-2002@med- ia.nokia.com;user=stream>
Cseq: 1 SUBSCRIBE
Call-ID: 4df6e7d8-5834-11d6-a882-00e00307ab95
Contact: <sip:172.21.164.126>
Expires: 3600
Event: session-description
Accept: application/sdp
Content-length: 0

Message F2

SIP/2.0 202 Accepted
To: <sip:reports/interim/q2-2002@media.nokia.com;user=stream>
From: <sip:user@nokia.com>
Call-ID: 4df6e7d8-5834-11d6-a882-- 00e00307ab95
Cseq: 1 SUBSCRIBE
Contact: <sip:reports/interim/q2-2002@131.228.54.140;user=stream>
Event: session-description
Content-length: 0

Message F3

NOTIFY sip:172.21.164.126 SIP/2.0
From: <sip:reports/interim- /q2-2002@media.nokia.com;user=stream>

Message F3

To: <sip:user@nokia.com>
Call-ID: 4df6e7d8-5834-11d6-a882-00e003- 07ab95
Cseq: 1 NOTIFY
Contact: <sip:reports/interim/q2-20- 02@131.228.54.140;user=stream>
Event: session-description
Content-type: application/sdp
Content-length: 131
v=0
o=media-server 1804289383 2 IN IP4 131.228.54.140
s=Nokia Interim Report Q2/2002
t=0 0
a=control: sip:reports/interim/q2-2002- @media.nokia.com;user=stream
a=sendonly
m=audio 0 RTP/AVP 96 97 98
a=rtpmap:96 AMR-WB/16000
a=rtpmap:97 AMR/8000
a=rtpmap:98 L16/48000/2

Message F4

SIP/2.0 200 OK
To: <sip:user@nokia.com>
From: <sip:reports/interim/q2-20- 02@media.nokia.com;user=stream>
Call-ID: 4df6e7d8-5834-11d6-a882- -00e00307ab95
Cseq: 1 NOTIFY
Content-length: 0

Message F5

INVITE sip:reports/interim/q2-2002@media.nokia.com; user=stream
SIP/2.0
From: <sip:user@nokia.com>
To: <sip:reports/interim/q2-2002@media.nokia.com;user=stream>
Call-ID: 87ed5e72-5834-11d6-a882-00e00307ab95
Cseq: 3 INVITE
Contact: <sip:172.21.164.126>
Content-type: application/sdp
Content-length: 131
v=0
0=− 816357754 1 IN IP4 172.21.164.126
s=−
t=0 0
c=IN IP4 172.21.164.126
a=recvonly m=audio 20582 RTP/AVP 96 98
a=rtpmap:96 AMR-WB/16000
a=rtpmap:97 L16/16000/2

Message F6

SIP/2.0 200 OK
To: <sip:reports/interim/q2-2002@media.nokia.com- ;user=stream>
From: <sip:user@nokia.com>
Call-ID: 87ed5e72-5834-11d6-a882-00e00307ab95
Cseq: 4 INVITE
Contact: <sip:reports/interim/q2-2002@131.228.54.140;user=stream>
Content-type: application/sdp
Content-length: 131
v=0
o=media-server 1804289383 321763 IN IP4 131.228.54.140
s=Nokia Interim Report Q2/2002
t=0 0
c=IN IP4 131.228.54.140
a=control: sip:reports/interim/q2-2002@media.nokia.com;user=stream
a=sendonly
m=audio 32852 RTP/AVP 96
a=rtpmap :96 AMR-WB/16000

| Message F7 |
|---|
| ACK sip:reports/interim/q2-2002@media.nokia.com;user=stream SIP/2.0<br>From: <sip:user@nokia.com><br>To: <sip:reports/interim/q2-20- 02@media.nokia.com;user=stream><br>Call-ID: 87ed5e72-5834-11d6-a882- -00e00307ab95<br>Cseq: 4 ACK<br>Content-length: 0 |

The connection between the client and the server is now established, and RTP media streaming starts. Next, the session description is updated within the media server and the media server notifies the client about a video stream that can be added to the session. The client asks server to add the video stream to the original stream, this is done in a similar way to the way in which the original audio streaming was started. Steps from F8 to F12 are similar to steps F3 to F7, so these steps are not described in detail. These messages are set out below.

| Message F8 NOTIFY sip:172.21.164.126 SIP/2.0 |
|---|
| From: <sip:reports/interim/q2-2002@media.nokia.com;user=stream><br>To: <sip:user@nokia.com><br>Call-ID: 4df6e7d8-5834-11d6-a882-00e00307ab95<br>Cseq: 5 NOTIFY<br>Contact: <sip:reports/interim/q2-2002@131.228.54.140;user=stream><br>Event: session-description Content-type: application/sdp<br>Content-length: 131<br>v=0<br>o=media-server 1804289383 3 IN IP4 131.228.54.140<br>s=Nokia Interim Report Q2/2002<br>t=0 0<br>a=control: sip:reports/interim/q2-2002@media.nokia.com;user=stream<br>a=sendonly<br>m=audio 0 RTP/AVP 96 97 98<br>a=rtpmap:96 AMR-WB/16000<br>a=rtpmap:97 AMR/8000<br>a=rtpmap:98 L16/48000/2<br>m=video 0 RTP/AVP 26 31 |

| Message F9 |
|---|
| SIP/2.0 200 OK<br>To: <sip:user@nokia.com><br>From: <sip:reports/interim/q2- 2002@media.nokia.com;user=stream><br>Call-ID: 4df6e7d8-5834-11d6-a882-00e00307ab95<br>Cseq: 5 NOTIFY<br>Content-length: 0 |

| Message F10 |
|---|
| INVITE sip: reports/interim/q2-2002@131.228.54.140:user=stream SIP/2.0<br>From: <sip:user@nokia.com><br>To: <sip:reports/interim/q2-20- 02@media.nokia.com;user=stream><br>Call-ID: 87ed5e72-5834-11d6-a882- -00e00307ab95<br>Cseq: 6 INVITE<br>Contact: <sip:172.21.164.126><br>Accept: application/sdp<br>Range: npt=0.000-<br>Content-type: application/sdp<br>Content-length: 131<br>v=0<br>o=– 816357754 1 IN IP4 172.21.164.126<br>s=–<br>t=0 0<br>c=IN IP4 172.21.164.126<br>a=recvonly |

| Message F10 |
|---|
| m=audio 20582 RTP/AVP 96 98<br>a=rtpmap:96 AMR-WB/16000<br>a=rtpmap:97 L16/16000/2<br>m=video 20584 RTP/AVP 26 31 |

| Message F11 |
|---|
| SIP/2.0 200 OK<br>To: <sip:reports/interim/q2-2002@media.nokia.com ;user=stream><br>From: <sip:user@nokia.com><br>Call-ID: 87ed5e72-5834-11d6-a882-00e00307ab95<br>Cseq: 6 INVITE<br>Contact: <sip:reports/interim/q2-2002@131.228.54.140;user=stream><br>Content-type: application/sdp<br>Content-length: 131<br>v=0<br>o=media-server 1804289383 321763 IN IP4 131.228.54.140<br>s=Nokia Interim Report Q2/2002<br>a=control: sip:reports/interim/q2-2002@media.nokia.com;user=stream<br>t=0 0<br>c=IN IP4 131.228.54.140<br>a=sendonly<br>m=audio 32852 RTP/AVP 96<br>a=rtpmap:96 AMR-WB/16000<br>m=video 32850 RTP/AVP 26 |

| Message F12 |
|---|
| ACK sip:reports/interim/q2-2002@131.228.54.140;user=stream SIP/2.0<br>From: <sip:user@nokia.com><br>To: <sip:reports/interim/q2-2002@media.nokia.com;user=stream><br>Call-ID: 87ed5e72-5834-11d6-a882-00e00307ab95<br>Cseq: 6 ACK<br>Content-length: 0 |

RTP Media streaming continues now with the both audio and video streams. When the Client wants to teardown the connection, the client sends message F13 BYE to the server. Steps F13 and F14 are typical connection teardown messages and they are similar to steps D8 and D9 of FIG. 4. These messages are set out below:

| Message F13 |
|---|
| BYE sip:reports/interim/q2-2002@131.2- 28.54.140;user=stream SIP/2.0<br>From: <sip:user@nokia.com><br>To: <sip:reports/interim/q2-2002@media.nokia.com;user=stream><br>Call-ID: 87ed5e72-5834-11d6-a882-00e00307ab95<br>Cseq: 7 BYE<br>Content-length: 0 |

| Message F14 |
|---|
| SIP/2.0 200 OK<br>To: <sip:reports/interim/q2-2002@media.nokia.com;user=stream><br>From: <sip:user@nokia.com><br>Call-ID: 87ed5e72-5834-11d6-a882-- 00e00307ab95<br>Cseq: 7 BYE<br>Content-length: 131 |

Figure 7:
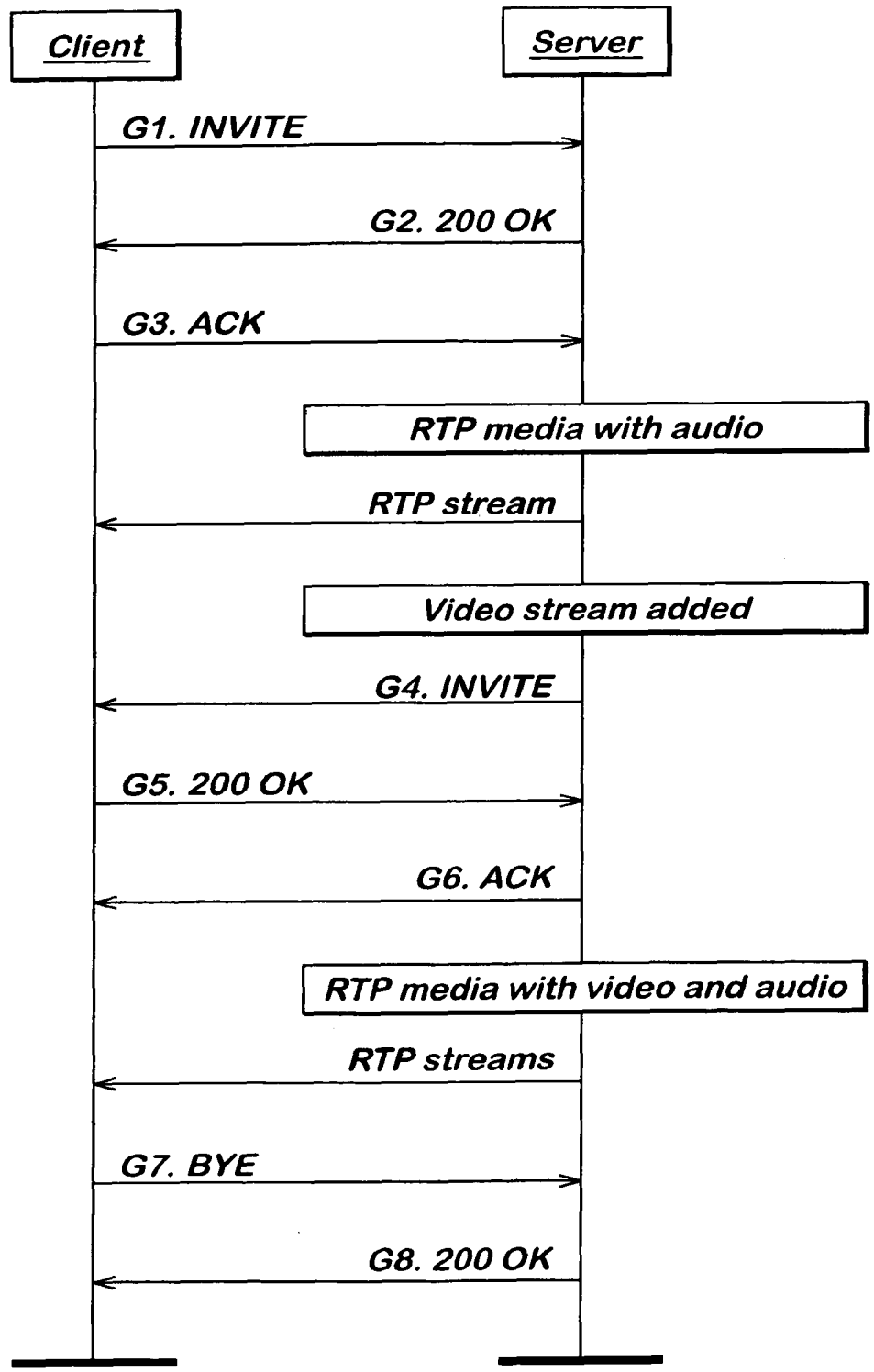
FIG. 7 illustrates an alternative updating of stream parameters in streaming

An alternative way to update stream parameters is shown in FIG. 7, which illustrates messaging between a client and a server. In this example updating streaming content is done by a server-initiated INVITE message. The new media stream (video) is negotiated and added simultaneously while the audio stream is played.

Communication between the Client and Server is started by the message G1 INVITE from Client to Server. Steps from G1 to G3 are similar to steps E4 to E6, steps G4 to G6 are similar to steps E7 to E9 and steps G7 and G8 are similar to steps E13 and E14 of FIG. 4. The messages are set out below.

| Message G1 |
| --- |
| INVITE sip:reports/interim/q2-2002@med- ia.nokia.com; user=stream SIP/2.0<br>From: <sip:user@nokia.com><br>To: <sip:reports/interim/q2-2002@med- ia.nokia.com;user=stream><br>Call-ID: 87ed5e72-5834-11d6-a882-00e00- 307ab95<br>Cseq: 1 INVITE<br>Contact: <sip:172.21.164.126><br>Accept: application/sdp<br>Contact: <sip:172.21.164.126><br>Content-type: application/sdp<br>Content-length: 131<br>v=0<br>o=− 816357754 1 IN IP4 172.21.164.126<br>s=−<br>t=0 0<br>c=IN IP4 172.21.164.126<br>a=recvonly<br>m=audio 20582 RTP/AVP 96 98<br>a=rtpmap:96 AMR-WB/16000<br>a=rtpmap:97 L16/16000/2<br>m=video 20584 RTP/AVP 26 31 |

| Message G2 |
| --- |
| SIP/2.0 200 OK<br>To: <sip:reports/interim/q2-2002@media.nokia.com;user=stream><br>From: <sip:user@nokia.com><br>Call-ID: 87ed5e72-5834-11d6-a882-00e00307ab95<br>Cseq: 1 INVITE<br>Contact: <sip:reports/interim/q2-2002@131.228.54.140;user=stream><br>Content-type: application/sdp<br>Content-length: 131<br>v=0<br>o=media-server 1804289383 321763 IN IP4 131.228.54.140<br>s=Nokia Interim Report Q2/2002<br>t=0 0<br>c=IN IP4 131.228.54.140<br>a=control: sip:reports/interim/q2-2002@media.nokia.com;user=stream<br>a=sendonly<br>m=audio 32852 RTP/AVP 96<br>a=rtpmap:96 AMR-WB/16000<br>m=video 0 RTP/AVP 26 31 |

| Message G3 |
| --- |
| ACK sip:reports/interim/q2-2002@media.nokia.com;user=stream SIP/2.0<br>From: <sip:user@nokia.com><br>To: <sip:reports/interim/q2-2002@media.nokia.com;user=stream><br>Call-ID: 87ed5e72-5834-11d6-a882-00e00307ab95<br>Cseq: 1 ACK<br>Content-length: 0 |

RTP Media streaming starts with audio only.

| Message G4 |
| --- |
| INVITE sip:172.21.164.126 SIP/2.0<br>From: <sip:reports/interim/q2-2002@media.nokia.com;user=stream> |

| Message G4 |
| --- |
| To: <sip:user@nokia.com><br>Call-ID: 87ed5e72-5834-11d6-a882-00- e00307ab95<br>Cseq: 1 INVITE<br>Contact: <sip:reports/interim/q2-2002@131.228.54.140;user=stream><br>Accept: application/sdp<br>Content-type: application/sdp<br>Content-length: 131<br>v=0<br>o=media-server 1804289383 321764 IN IP4 131.228.54.140<br>s=Nokia Interim Report Q2/2002<br>t=0 0 c=IN IP4 131.228.54.140<br>a=control: sip:reports/interim/q2-2002@media.nokia.com;user=stream<br>a=sendonly<br>m=audio 33400 RTP/AVP 96<br>a=rtpmap:96 AMR-WB/16000<br>m=video 33402 RTP/AVP 26 31 |

| Message G5 |
| --- |
| SIP/2.0 200 OK<br>From: <sip:reports/interim/q2-2002@media.nokia.c- om;user=stream><br>To: <sip:user@nokia.com><br>Call-ID: 87ed5e72-5834-11d6-a882-00e00307ab95<br>Cseq: 1 INVITE<br>Contact: <sip:172.21.164.126><br>Content-type: application/sdp<br>Content-length: 131<br>v=0<br>o=− 816357754 2 IN IP4 172.21.164.126<br>s=−<br>t=0 0<br>c=IN IP4 172.21.164.126<br>a=recvonly<br>m=audio 20582 RTP/AVP 96<br>a=rtpmap:96 AMR-WB/16000<br>m=video 20584 RTP/AVP |

| Message G6 |
| --- |
| ACK sip:172.21.164.126 SIP/2.0<br>From: <sip:user@nokia.com><br>To: <sip:reports/interim/q2-2002@media.nokia.com;user=stream><br>Call-ID: 87ed5e72-5834-11d6-a882-00e00307ab95<br>Cseq: 1 ACK<br>Content-length: 0 |

RTP Media streaming continues now with the both audio and video. When the Client wants to teardown the connection, normal teardown procedure is done.

| Message G7 |
| --- |
| BYE sip:reports/interim/q2-2002@131.228.54.140;user=stream SIP/2.0<br>From: <sip:user@nokia.com><br>To: <sip:reports/interim/q2-20- 02@media.nokia.com;user=stream><br>Call-ID: 87ed5e72-5834-11d6-a882- -00e00307ab95<br>Cseq: 3 BYE<br>Content-length: 0 |

| Message G8 |
| --- |
| SIP/2.0 200 OK<br>To: <sip:reports/interim/q2-2002@media.nokia.com;user=stream><br>From: <sip:user@nokia.com><br>Call-ID: 87ed5e72-5834-11d6-a882-00e00307ab95 |

| Message G8 |
|---|
| Cseq: 3 BYE<br>Content-length: 0 |

Figure 8:
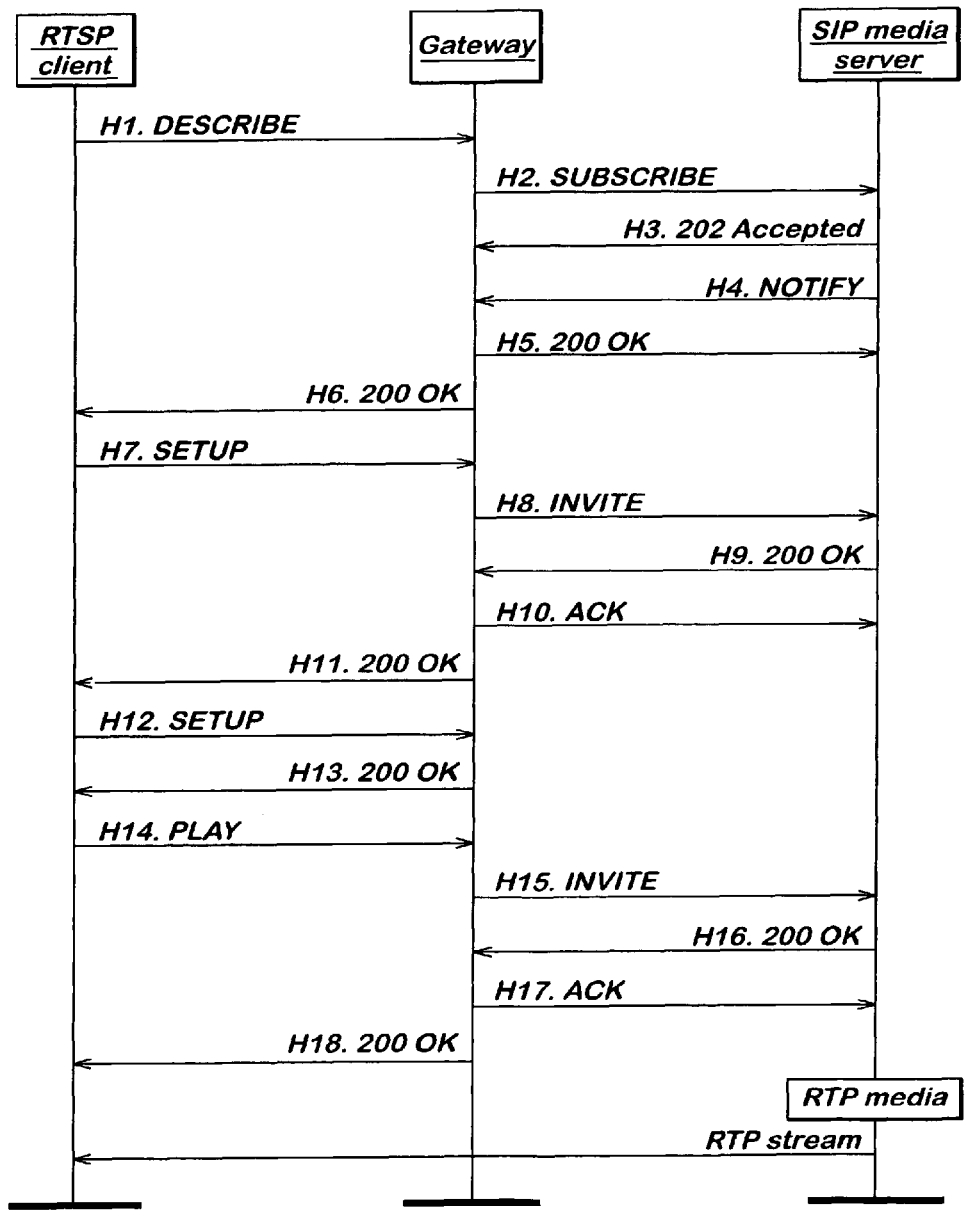
FIGS. 8 and 9 illustrates use of gateway between RTSP and SIP, where RTSP clients connects to a gateway and receives a video stream and RTSP messages are mapped to SIP messages. 7
Figure 9:
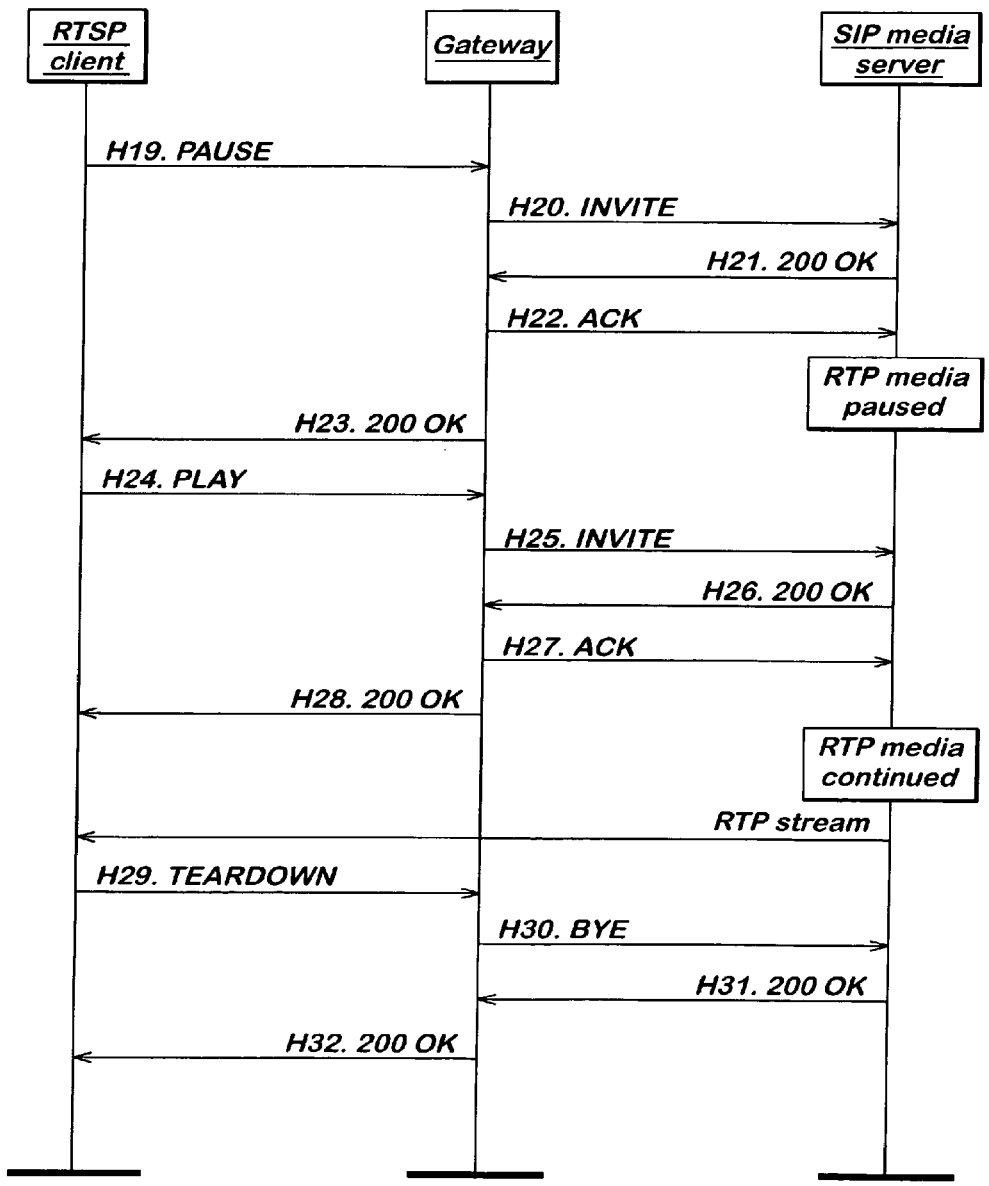

The last example describes an ordinary RTSP client connecting to a gateway and it initiates receiving a video stream. FIGS. 8 and 9 illustrate the messaging between RTSP client, gateway and SIP media server, with FIG. 8 showing the first part of the signaling and FIG. 9 showing the second part of the signaling.

The request for streaming media by the RTSP client is announced by message H1 DESCRIBE from the RTSP client to the gateway.

| Message H1 |
|---|
| DESCRIBE rtsp://media-gw.nokia.com/twister RTSP/1.0<br>CSeq: 1 |

This message is a RTSP message and it indicates what the RTSP client is requesting and where from, also version of RTSP is indicated to be 1.0

When the gateway receives message H1, it maps the message so that it can create a SIP-MEX message from it. The gateway sends message H2-SUBSCRIBE to the SIP media server. Communication between the gateway and SIP Media Server is similar to previous examples, so that steps from H2 to H5 are similar to steps D1 to D4 in FIG. 4. These messages are:

| Message H2 |
|---|
| SUBSCRIBE sip:twister@media.nokia.com;- user=stream SIP/2.0<br>From: <sip:user@nokia.com><br>To: <sip:twister@media.nokia.com;user=stream><br>Cseq: 1 SUBSCRIBE<br>Call-ID: 1c5e3780-5834-11d6-a882-00e00307ab95<br>Contact: <sip:131.228.237.22><br>Expires: 0<br>Event: session-description<br>Accept: application/sdp<br>Content-length: 0 |

| Message H3 |
|---|
| SIP/2.0 202 Accepted<br>To: <sip:twister@media.nokia.com;user=stream><br>From: <sip:user@nokia.com><br>Call-ID: 1c5e3780-5834-11d6-a882-00e003- 07ab95<br>Contact: <sip:twister@131.228.54.140;user=stream><br>Event: session-description<br>Cseq: 1 SUBSCRIBE<br>Content-length: 0 |

| Message H4 |
|---|
| NOTIFY sip:131.228.237.22 SIP/2.0<br>From: <sip:twister@media.nokia.com;user=stream><br>To: <sip:user@nokia.com><br>Call-ID: 1c5e3780-5834-11d6-a882-- 00e00307ab95<br>Contact: <sip:twister@131.228.54.140;user=stream>-<br>CSeq: 1 NOTIFY<br>Event: session-description Range: smtpe-25=00:00:00-02:16:13 |

| Message H4 |
|---|
| Content-type: application/sdp<br>Content-length: 131<br>v=0<br>o=media-server 1804289383 2 IN IP4 131.228.54.140<br>s=Twister<br>a=control: sip:twister@media.nokia- .com;user=stream<br>t=0 0<br>a=sendonly<br>m=audio 0 RTP/AVP 0<br>m=video 0 RTP/AVP 26 |

| Message H5 |
|---|
| SIP/2.0 200 OK<br>To: <sip:user@nokia.com><br>From: <sip:twister@media.nokia.com;user=stream><br>Call-ID: 1c5e3780-5834-11d6-a882-00e00307ab95<br>CSeq: 1 NOTIFY Content-length: 0 |

The gateway sends information about the requested streaming media to the RTSP client in message H6—200 OK.

| Message H6 |
|---|
| RTSP/1.0 200 OK<br>CSeq: 1 Content-Type: application/sdp<br>Content-Length: 164<br>v=0<br>o=− 2890844256 2890842807 IN IP4 172.16.2.93<br>s=Twister<br>a=control:rtsp://media-gw.nokia.com/twister<br>t=0 0 m=audio 0 RTP/AVP 0 a=control:audio<br>m=video 0 RTP/AVP 26<br>a=control:video |

Fields in this message are common to RTSP and will be clear to a person skilled in the art.

The RTSP Client now starts streaming the movie and sends message H7-SETUP to the gateway.

| Message H7 |
|---|
| SETUP rtsp://media-gw.nokia.com/twister/audio RTSP/1.0<br>CSeq: 2<br>Transport: RTP/AVP;unicast;client_port=8000-8001 |

Fields in this message are common to RTSP.

The gateway receives the H7 message from RTSP client and interprets message H7 to a form that the SIP media server can understand. The gateway sends message H8-INVITE to the SIP media server. Communication between the gateway and the SIP media server is similar to previous examples, so that steps from H8 to H10 are similar to steps D5 to D7 in FIG. 4.

| Message H8 |
|---|
| INVITE sip:twister@media.nokia.com;user=stream SIP/2.0<br>From: <sip:user@nokia.com><br>To: <sip:twister@media.nokia.com;user=stream><br>Cseq: 1 INVITE Call-ID: 87ed5e72-5834-11d6-a882-00e00307ab95<br>Contact: <sip:131.228.237.22><br>Content-length: 0 |

Message H9

SIP/2.0 200 OK
To: <sip:twister@media.nokia.com;user=str- eam>
From: <sip:user@nokia.com>
Cseq: 1 INVITE
Call-ID: 87ed5e72-5834-11d6-a882-00e00307ab95
Contact: <sip:twister@131.228.54.140;user=stream>
Content-type: application/sdp
Content-length: 131
v=0
o=media-server 1804289383 321763 IN IP4 131.228.54.140
s=Twister a=control: sip:twister@131.228.54.140;user=stream
t=0 0
c=IN IP4 131.228.54.140
a=sendonly
a=range:smtpe-25=00:00:00-02:16:13
m=audio 9004 RTP/AVP 0
a=rtpinfo: seq=92781365;rtptime=21375134
m=video 9002 RTP/AVP 26
a=rtpinfo: seq=9810092;rtptime=3450012

Message H10

ACK sip:twister@131.228.54.140;user=stream SIP/2.0
From: <sip:user@nokia.com>
To: <sip:twister@media.nokia.com;us- er=stream>
Cseq: 1 ACK
Call-ID: 87ed5e72-5834-11d6-a882- -00e00307ab95
Content-length: 83
v=0
o=- 816357754 1 IN IP4 172.21.164.126
s=-
t=0 0
c=IN IP4 172.21.164.126
a=inactive
m=audio 8000 RTP/AVP 0
m=video 0 RTP/AVP 26

The gateway sends confirmation to the RTSP client in message H11-200 OK.

Message H11

RTSP/1.0 200 OK
CSeq: 2
Transport: RTP/AVP;unicast;client_port=8000-8001;
source=131.228.54.140;server_port=9004-9005 Session: 12345678

Fields in this message are common to RTSP.

The RTSP client sets up also the video session and sends message H12 SETUP to the gateway

Message H12

SETUP rtsp://media-gw.nokia.com/t- wister/video RTSP/1.0
CSeq: 3
Transport: RTP/AVP;unicast;client_port=8002-8003

Fields in this message are common to RTSP.

The Gateway confirms the request H12 for adding of the video session by sending message H13-200 OK to the RTSP client.

Message H13

RTSP/1.0 200 OK
CSeq: 3

Message H13 -continued

Transport: RTP/AVP;unicast;client_port=8002-8003;
source=131.228.54.140;server_port=9002-9003;
Session: 12345678

Fields in this message are common to RTSP.

The RTSP client requests that playing of the streaming media starts and sends message H14 to the gateway.

Message H14

PLAY rtsp://media-gw.nokia.com/twister RTSP/1.0
CSeq: 4
Range: npt=0-
Session: 12345678

The gateway requests to the SIP media server that video streaming should also be included. The gateway sends message H15-INVITE to the SIP media server. Communication between the gateway and the SIP media server is similar to the previous examples, so that steps H15 to H17 are similar to steps H8 to H10.

Message H15

INVITE sip:twister@131.228.54.140- ;user=stream SIP/2.0
From: <sip:user@nokia.com>
To: <sip:twister@media.nokia.com;user=stream>
Cseq: 2 INVITE
Call-ID: 87ed5e72-5834-11d6-a882-00e00307ab95
Contact: <sip:131.228.237.22>
Content-length: 0
v=0
o=- 816357754 2 IN IP4 172.21.164.126
s=-
t=0 0
c=IN IP4 172.21.164.126
a=recvonly a=range:ntp=0-
m=audio 8000 RTP/AVP 0
m=video 8002 RTP/AVP 26

Message H16

SIP/2.0 200 OK
To: <sip:twister@media.nokia.com;us- er=stream>
From: <sip:user@nokia.com>
Cseq: 2 INVITE Call-ID: 87ed5e72-5834-11d6-a882-00e00307ab95
Contact: <sip:twister@131.228.54.140;user=stream>
Content-type: application/sdp
Content-length: 131
v=0
o=media-server 1804289383 321763 IN IP4 131.228.54.140
s=Twister
a=control: sip:twister@131.228.54.140;user=stream
t=0 0
c=IN IP4 131.228.54.140
a=sendonly
a=range:ntp=0-
m=audio 9000 RTP/AVP 0
a=rtpinfo: seq=656823807;rtptime=2829945
m=video 9002 RTP/AVP 26
a=rtpinfo: seq=9810092;rtptime=3450012

Message H17

```
ACK sip:twister@131.228.54.140;user=stream SIP/2.0
From: <sip:user@nokia.com>
To: <sip:twister@media.nokia.com;us er=stream>
Cseq: 2 ACK
Call-ID: 87ed5e72-5834-11d6-a882- -00e00307ab95
Content-length: 83
```

The gateway sends confirmation to the RTSP client in message H18-200 OK.

Message H18

```
RTSP/1.0 200 OK
CSeq: 4
Session: 12345678
RTP-Info: url=rtsp://media-gw.nokia.com/t- wister/audio ;seq=
656823807;rtptime=2829945
RTP-Info: url=rtsp: //media-gw.nokia.com/twister/video ;seq=
9810092;rtptime=3450012
```

Fields in this message are common to RTSP.

The RTSP Client now receives the streaming media from the SIP Media Server. Next the RTSP Client wants to pause the streaming media from the SIP Media Server. The RTSP Client sends message H19-Pause to the Gateway.

Message H19

```
PAUSE rtsp://media-gw.nokia.com/twister RTSP/1.0
CSeq: 5
Session: 12345678
```

Fields in this message are common to RTSP.

Gateway receives this message H19 PAUSE and it interprets it to a form that the SIP Media Player can understand it. Gateway sends message H21 to the SIP media server to pause the streaming. Messages H20 and H21 have value "inactive" in their field a of the message—this feature of embodiments of the present invention pauses the streaming in the SIP Media Server. Otherwise steps H20 to H22 similar to steps H8 to H10 earlier in this example.

Message H20

```
INVITE sip:twister@131.228.54.140 ;user=stream SIP/2.0
From: <sip:user@nokia.com>
To: <sip:twister@media.nokia.com;user=stream>
Cseq: 3 INVITE Call-ID: 87ed5e72-5834-11d6-a882-00e00307ab95
Contact: <sip:131.228.237.22>
Content-length: 0
v=0
o=- 816357754 2 IN IP4 172.21.164.126
s=-
t=0 0
c=IN IP4 172.21.164.126
a=inactive
m=audio 8000 RTP/AVP 0
m=video 8002 RTP/AVP
```

Message H21

```
SIP/2.0 200 OK
To: <sip:twister@media.nokia.com;user=stream>
From: <sip:user@nokia.com>
Cseq: 3 INVITE
Call-ID: 87ed5e72-5834-11d6-a882-00e00307ab95
```

Message H21

```
Contact: <sip:twister@131.228.54.140;user=stream>
Content-type: application/sdp
Content-length: 131
v=0
o=media-server 1804289383 321763 IN IP4 131.228.54.140
s=Twister
a=control: sip:twister@131.228.54.140;user=stream
t=0 0
c=IN IP4 131.228.54.140
a=inactive
m=audio 9000 RTP/AVP 0
m=video 9002 RTP/AVP
```

Message H22

```
ACK sip:twister@131.228.54.140;user=stream SIP/2.0
From: <sip:user@nokia.com>
To: <sip:twister@media.nokia.com;user=stream>
Cseq: 3 ACK
Call-ID: 87ed5e72-5834-11d6-a882- -00e00307ab95
Content-length: 83
```

RTP media is now paused. The gateway sends confirmation to the RTSP client in message H23-200 OK.

Message H23

```
RTSP/1.0 200 OK
CSeq: 5
Session: 12345678
```

Fields in this message are common to RTSP.

The RTSP client is ready to resume playing the stream, so the Client sends message H24-PLAY to the Gateway.
Message H24 PLAY from RTSP Client to Gateway
PLAY rtsp://media-gw.nokia.com/twister RTSP/1.0
CSeq: 6
Range: npt=15-
Session: 12345678

Fields in this message are common to RTSP.

The gateway requests that the SIP media server resume the streaming media from the point it was paused. The gateway sends message H25-INVITE to the SIP Media Server. Communication between the gateway and the SIP media server is similar to previous steps, that is steps H25 to H27 are similar to steps H13 to H15.

Message H25

```
INVITE sip:twister@ 131.228.54.140;user=stream SIP/2.0
From: <sip:user@nokia.com>;
To: <sip:twister@media.nokia.com;user=stream>
Cseq: 4 INVITE
Call-ID: 87ed5e72-5834-11d6-a882-00e00307ab95
Contact: <sip:131.228.237.22>
Content-length: 0
v=0
o=- 816357754 2 IN IP4 172.21.164.126
s=-
t=0 0
c=IN IP4 172.21.164.126
a=recvonly
a=range: npt=15-
m=audio 8000 RTP/AVP 0
m=video 8002 RTP/AVP 26
```

| Message H26 |
| --- |
| SIP/2.0 200 OK<br>To: <sip:twister@media.nokia.com;user=stream><br>From: <sip:user@nokia.com><br>Cseq: 4 INVITE<br>Call-ID: 87ed5e72-5834-11d6-a882-00e00307ab95<br>Contact: <sip:twister@ 131.228.54.140;user=stream><br>Content-type: application/sdp<br>Content-length: 131<br>v=0<br>o=media-server 1804289383 321763 IN IP4 131.228.54.140<br>s=Twister<br>a=control: sip:twister@ 131.228.54.140;user=stream<br>t=0 0<br>c=IN IP4 131.228.54.140<br>a=sendonly<br>a=range: npt=15-<br>m=audio 9000 RTP/AVP 0<br>a=rtpinfo:seq=656823882;rtptime=2949945<br>m=video 9002 RTP/AVP 26<br>a=rtpinfo:seq=9810467;rtptime=3450027 |

| Message H27 |
| --- |
| ACK sip:twister@ 131.228.54.140;user=stream SIP/2.0<br>From: <sip:user@nokia.com><br>To: <sip:twister@media.nokia.com;user=stream><br>Cseq: 4 ACK<br>Call-ID: 87ed5e72-5834-11d6-a882-00e00307ab95<br>Content-length: 83 |

The gateway sends confirmation to the RTSP client in message H28-200 OK.

| Message H28 |
| --- |
| RTSP/1.0 200 OK<br>  CSeq: 6<br>  Session: 12345678<br>  RTP-Info: url=rtsp://media-gw.nokia.com/twister/audio ;seq=<br>  656823882;rtptime=2949945<br>  RTP-Info: url=rtsp://media-gw.noki- a.com/twister/video ;seq=<br>  9810467;rtptime=3450027 |

Fields in this message are common to RTSP.

The RTSP Client again receives streaming media from the SIP media server. Next the RTSP client wants to stop the streaming media from the SIP media server. The RTSP Client sends message H29-TEARDOWN to the Gateway.

| Message H29 |
| --- |
| TEARDOWN rtsp://media-gw.nokia.com/twister RTSP/1.0<br>CSeq: 7<br>Session: 12345678 |

Fields in this message are common to RTSP.

The gateway receives message H29-TEARDOWN from the RTSP client. The typical teardown procedure is done. Message H30-BYE is sent to the SIP media server to start the teardown. Steps H30 and H 31 are similar to steps D8 and D9 of FIG. 4.

| Message H30 |
| --- |
| BYE sip:twister@ 131.228.54.140;user=stream SIP/2.0<br>From: <sip:user@nokia.com>;<br>To: <sip:twister@media.nokia.com;user=stream> |

| Message H30 |
| --- |
| Cseq: 5 BYE<br>Call-ID: 87ed5e72-5834-11d6-a882-00e00307ab95<br>Content-length: 0 |

| Message H31 |
| --- |
| SIP/2.0 200 OK<br>To: <sip:twister@media.nokia.com;user=stream><br>From: <sip:user@nokia.com><br>Cseq: 5 BYE Call-ID: 87ed5e72-5834-11d6-a882-00e00307ab95<br>Content-length: 0 |

The Gateway sends confirmation to the RTSP client in message H32-200 OK.

| Message H32 |
| --- |
| RTSP/1.0 200 OK<br>CSeq: 7 |

Fields in this message are common to RTSP.

In embodiments of the invention, a communication network is able to dynamically select best format for streaming media regardless whether the domain of the user is based on RTSP or SIP. In embodiments of the invention, media streaming extensions for the SIP protocol are proposed in order to create a version of SIP with media streaming extensions. In the embodiments, this is SIP-MEX, which adds all the RTSP functionality to SIP. Embodiments of the invention enable mapping between RTSP and SIP-MEX, and connection between SIP and RTSP-domains can be achieved with a gateway between them.

With SIP-MEX there is no need for a separate streaming protocol or network proxies for streaming services. According to one embodiment of the invention, existing SIP architecture can be used to provide an easy billing scheme to streaming services, and user applications can access streaming media more easily. The streaming media resources, like video clips, can be accessed with a plain Internet telephone application.

In accordance with another embodiment of the present invention, in internet telephony SIP requests to streaming media resources can be distinguished from telephony requests, and the streaming media can be cached.

By adding the functionality of multimedia streaming SIP, it is possible to use media streaming parameters (range, scale, speed) in the SIP messages. In embodiments of the invention streaming media format may be selected dynamically in RTSP environment, which means updating media session during the streaming. On the other hand that SIP environment can support RTSP-functionality, which enables mapping between RTSP and SIP-MEX, and their: URLs (Uniform Resource Locator).

Embodiments of the invention provide a to establish a media session in SIP/SDP with properly negotiated medias. The SIP protocol or the SDP (Session Description Protocol) descriptions used by SIP is extended so that they can provide all the RTSP functionality. The SIP with media streaming extensions (SIP-MEX) can be used in various network configurations as described above.

Thus embodiments of the invention may provide a method for mapping between RTSP URLs and SIP URLs. The URL to the media resource is given in RTSP request line, e.g. SETUP rtsp://media.nokia.com/movies/matrix RTSP/1.0 When a SIP element is given a media resource URL, e.g. rtsp://media.nokia.com/movies/matrix, it needs to convert the RTSP URL to a SIP URL. The mapping is straightforward: the host:port part is left as is and the SIP username part is used to express the media resource, in this case, movies/matrix, like as follows: INVITE sip:movies/matrix@media.nokia.com SIP/2.0 To distinguish between the media stream resources and legacy SIP usernames, like sip:user@nokia.com, and make it possible to unambiguously map between SIP and RTSP URLs, the parameter user=stream can be used: INVITE sip:movies/matrix@media.nokia.com;user=stream SIP/2.0

The user=stream parameter tells the Sims registrar, proxy or application server (AS) to handle the requests to media streaming resources properly (i.e., do not mix them with normal users). A proxy can also cache streaming media accessed with a user=stream parameter. An UA processing an SIP URL with user=stream parameter can add the streaming controls (play, rewind, pause, etc.) to the user interface.

Embodiments of the invention may provides means for updating media session during the streaming SIP event extension, SUBSCRIBE-NOTIFY methods, can be used to retrieve the stream parameter data expressed in Session Description Protocol (SDP). If the stream parameters change during the playback, e.g. a video channel is added to a live stream, a new NOTIFY containing updated SDP can be sent to the client. The client then can send a new INVITE (re-INVITE) to the server and media is negotiated again.

When using RTSP, the Range header specifies the point where the playback starts. No such header currently exists in SIP. There is two alternative solutions, the Range header can be added to SIP or a Range attribute can be added to SDP.

The syntax of the RTSP Range header is as follows:
Range="Range" ":" 1\#ranges-specifier
[";" "time" "=" utc-time]
ranges-specifier=npt-range|utc-range|smpte-range
Example as a SIP Header:
Range: clock=19960213T143205Z-;time=19970123T143720Z
Example as an SDP Attribute:
a=range:clock=19960213T143205Z-;time=19970123T143720Z Scale header is used in the RTSP playback or record to view/listen the media stream at different playback rates (implementing fast forward/fast rewind). For example, with Scale: 3.0 the server would transmit media with timestamps changing three times as fast as normally. Just like Range, SIP needs to be extended with Scale header or a Scale attribute could be added to the SDP description.
Example as a SIP Header:
Scale: −1.0
Example as an SDP Attribute:
a=scale: −1.0

Speed is used to ask the server to deliver playback stream at a particular transfer rate, for example, with Speed: 3.0 the server would transmit media with playback time of 3.0 seconds within 1.0 second. The playback rate is not affected by transfer rate. This allows client to buffer the stream and avoid interrupts in the playback (due to network congestion). Again, a new SIP header or SDP attribute can be used.

Consider the following example of a video stream. It contains 25 frames a second. The server puts a timestamp to each frame, and client plays the frames at the time indicated by the timestamp.
The stream is normally transmitted like this:
A..B..C..D..E..F..G..H..I..J..K..L..M..N..O..P..Q..R..S..T..U..V..W..X..Y..Z
And played like this
A..B..C..D..E..F..G..H..I..J..K..L..M..N..O..P..Q..R..S..T..U..V..W..X..Y..Z
In this case, the real time, the time in video clip and time indicated by timestamps go at the same rate.
With Speed: 3.0, the frames are transmitted like this:
ABCDEFGHIJKLMNOPQRSTUVWXYZab-cdefghijklmnopqrstuvwxyz0123456789 @!#$%&/©=+?®
But played out like this: A..B..C..D..E..F..G..H..I..J..K..L..M..N..O..P..Q..R..S..T..U..V..W..X..Y..Z
In this case, the time indicated by timestamps (and video time) go three times faster than the real time. However, the playout happens at normal rate.
With Scale: 3.0, they are transmitted like this (assuming the streaming server is intelligent enough to drop extra frames away): A..D..G..J..M..P..S..V..Y..b..e..h..k..n..q..t..w..z..2..5..8..!%.. .©..?..
And played out like this: A..D..G..J..M..P..S..V..Y..b..e..h..k..n..q..t..w..z..2..5..8..!%..©..?..
In this case, the real time and time indicated by timestamps go again at the same rate, but the time in video clip is accelerated.

In this case, the time indicated by timestamps (and video time) go three times faster than the real time. However, the playout happens at normal rate. With Scale: 3.0, they are transmitted like this (assuming the streaming server is intelligent enough to drop extra frames away): A.D.G.J.M.S.V.Y.b.e.h.k.n.q.t.w.z.2.5.8.!.%.. ©..?..quadrature. And played out like this: A.D.G.J.M.P.S.V.Y.b.e.h.k.n.q.t.w.z.2.5.8.!.%..COPY-RGT..?..quadrature. In this case, the real time and time indicated by timestamps go again at the same rate, but the time in video clip is accelerated.

SIP event extension, SUBSCRIBE-NOTIFY methods, can be used to retrieve the stream parameter data expressed in Session Description Protocol (SDP). If the stream parameters change during the playback, e.g., a video channel is added to a live stream, a new NOTIFY containing updated SDP can be sent to the client. The client then can send a new INVITE (re-iNVITE) to the server and media is negotiated again.

Parameter update can also be handled with re-INVITE, sent by the streaming server. There is no need to use NOTIFY to bear change information. The re-INVITE is now used in opposite direction, the streaming server sends the re-INVITE and the streaming client receives it. Note, however, that a RTSP-SIP gateway can not always honor the re-INVITE sent by streaming server.

Parameter update can also be handled with re-INVITE, sent by the streaming server. There is no need to use NOTIFY to bear change information. The re-INVITE is now used in opposite direction, the streaming server sends the re-INVITE and the streaming client receives it.

It should be appreciated that is some embodiments of the invention, the initially established SIP session may be without streaming with the streaming being added and/or negotiated later. In other embodiments of the invention, the SIP session maybe established with a media stream session.

The implementation is mostly done in application level. The protocol level (SIP/SDP) implementation is by adding a support for extension headers/attributes. The application level implementation is done for the server and client.

What is claimed is:

1. A method comprising:
   sending a first session invitation protocol (SIP) message from a first device to a second device, wherein a first header field of the first SIP message includes a first indicator indicating a request for a media stream and a source of the requested media stream, wherein the first SIP message comprises a contact header and wherein the contact header comprises a parameter that indicates the requested media is to be streamed to the first device;
   receiving a second SIP message from the second device at the first device, wherein a second header field of the second SIP message includes a second indicator indicating acceptance of the request for the media stream;
   sending a third SIP message from the first device to the second device, wherein a third header field of the third SIP message includes a third indicator indicating that the second device initiate streaming of the requested media stream; and
   receiving the requested media stream from the second device at the first device.

2. The method of claim 1, wherein the first indicator is a SIP media streaming extension (SIP-MEX).

3. The method of claim 1, wherein the first indicator includes a uniform resource identifier (URI) identifying the source of the requested media stream.

4. The method of claim 3, wherein a parameter of the URI indicates that streaming is to be used.

5. The method of claim 1, wherein the first SIP message is a SUBSCRIBE message.

6. The method of claim 1, wherein the second SIP message is an Accepted message.

7. The method of claim 1, wherein the second indicator is a SIP media streaming extension (SIP-MEX).

8. The method of claim 1, wherein the third SIP message includes streaming parameters for the requested media stream.

9. The method of claim 8, wherein the third SIP message is a NOTIFY message.

10. The method of claim 8, wherein the streaming parameters include a stream description included in a payload of the third SIP message.

11. The method of claim 10, wherein the stream description includes a uniform resource identifier used to control the media stream.

12. The method of claim 10, wherein the stream description is defined using a session description protocol language.

13. The method of claim 8, wherein the streaming parameters are included in a header field of the third SIP message.

14. The method of claim 13, wherein the streaming parameters include a length of the requested media stream.

15. The method of claim 1, wherein the second device is a gateway that processes real time streaming protocol (RTSP) messages from a third device and maps the SIP messages to RTSP messages.

16. The method of claim 1, wherein the first device is a gateway that processes real time streaming protocol (RTSP) messages from a third device and maps RTSP messages to the SIP messages.

17. The method of claim 1, wherein the requested media stream is received using an RTP stream.

18. A non-transitory computer-readable medium having instructions stored thereon, the instructions comprising:
   instructions to send a first session invitation protocol (SIP) message from a first device to a second device, wherein a first header field of the first SIP message includes a first indicator indicating a request for a media stream and a source of the requested media stream, wherein the first SIP message comprises a contact header and wherein the contact header comprises a parameter that indicates the requested media is to be streamed to the first device;
   instructions to receive a second SIP message from the second device at the first device, wherein a second header field of the second SIP message includes a second indicator indicating acceptance of the request for the media stream;
   instructions to send a third SIP message from the first device to the second device, wherein a third header field of the third SIP message includes a third indicator indicating that the second device initiate streaming of the requested media stream; and
   instructions to receive the requested media stream from the second device at the first device.

19. A system comprising:
   one or more processors configured to:
      send a first session invitation protocol (SIP) message from a first device to a second device, wherein a first header field of the first SIP message includes a first indicator indicating a request for a media stream and a source of the requested media stream, wherein the first SIP message comprises a contact header and wherein the contact header comprises a parameter that indicates the requested media is to be streamed to the first device;
      receive a second SIP message from the second device at the first device, wherein a second header field of the second SIP message includes a second indicator indicating acceptance of the request for the media stream;
      send a third SIP message from the first device to the second device, wherein a third header field of the third SIP message includes a third indicator indicating that the second device initiate streaming of the requested media stream; and
      receive the requested media stream from the second device at the first device.

* * * * *